(12) United States Patent
Kim et al.

(10) Patent No.: US 9,801,034 B2
(45) Date of Patent: Oct. 24, 2017

(54) VEHICLE AND CONTROL METHOD THEREOF

(71) Applicant: LG ELECTRONICS INC., Seoul (KR)

(72) Inventors: Inshick Kim, Seoul (KR); Sukjin Chang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/149,712

(22) Filed: May 9, 2016

(65) Prior Publication Data
US 2016/0337822 A1    Nov. 17, 2016

(30) Foreign Application Priority Data
May 13, 2015  (KR) .................. 10-2015-0066749

(51) Int. Cl.
| G08G 1/00 | (2006.01) |
| H04W 4/12 | (2009.01) |
| B62D 1/04 | (2006.01) |
| B60K 35/00 | (2006.01) |
| G06F 3/023 | (2006.01) |
| G06F 3/02 | (2006.01) |

(52) U.S. Cl.
CPC .............. *H04W 4/12* (2013.01); *B60K 35/00* (2013.01); *B62D 1/046* (2013.01); *G06F 3/023* (2013.01); *G06F 3/0219* (2013.01); *B60K 2350/1056* (2013.01); *B60K 2350/962* (2013.01)

(58) Field of Classification Search
CPC ............ H04W 4/12; B60W 40/08; G06F 3/02
USPC ............. 340/901, 988, 425.5, 309.16, 815.4, 340/384.1, 457; 455/411, 414.2
See application file for complete search history.

(56) References Cited

U.S. PATENT DOCUMENTS

| 9,380,143 | B2 * | 6/2016 | Barabas | ............... H04M 1/6091 |
| 2010/0184406 | A1 * | 7/2010 | Schrader | ............. H04M 1/6091 |
| | | | | 455/411 |
| 2011/0045872 | A1 | 2/2011 | Simmons | |
| 2012/0268235 | A1 * | 10/2012 | Farhan | ............... G05B 23/0278 |
| | | | | 340/3.1 |
| 2013/0151111 | A1 * | 6/2013 | Skelton | .................. B60R 25/00 |
| | | | | 701/99 |

FOREIGN PATENT DOCUMENTS

| KR | 10-2013-0008979 A | 1/2013 |
| KR | 10-2013-0080915 A | 7/2013 |
| KR | 10-2015-0050838 A | 5/2015 |

\* cited by examiner

*Primary Examiner* — Phung Nguyen
(74) *Attorney, Agent, or Firm* — Birch, Stewart, Kolasch & Birch, LLP

(57) ABSTRACT

A vehicle including a wireless communication processor configured to provide wireless communication; a keypad; a display unit configured to display a character corresponding to a key input through the keypad; and a controller configured to activate the keypad when information related to a driving of the vehicle satisfies a preset condition, and deactivate the keypad when the information related to the driving of the vehicle does not satisfy the preset condition.

21 Claims, 18 Drawing Sheets

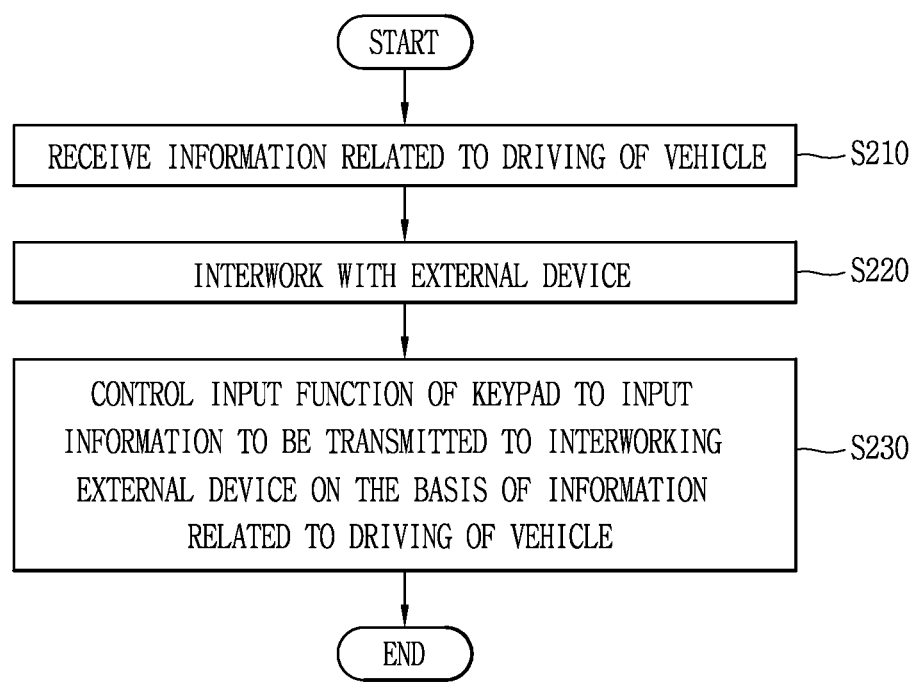

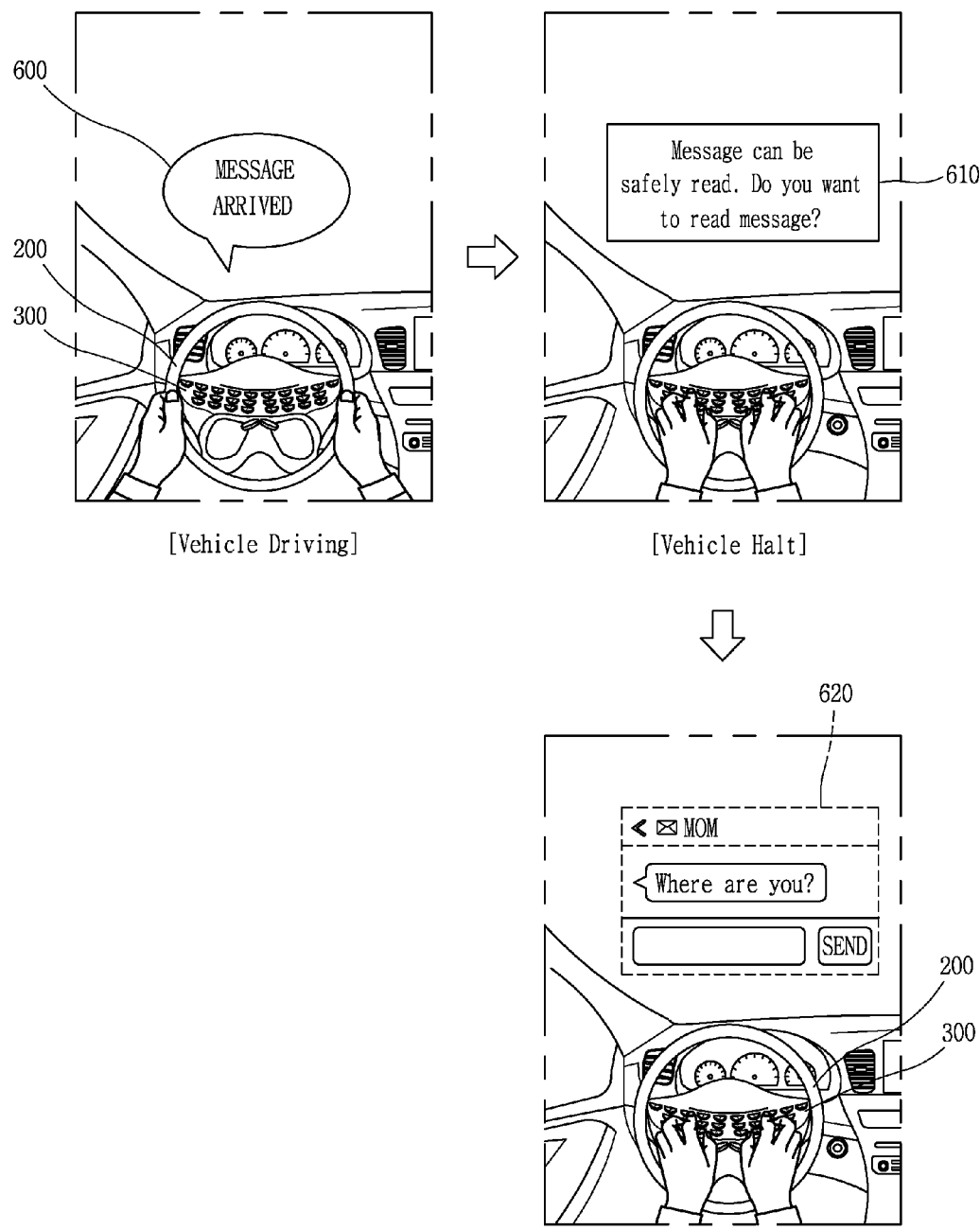

FIG. 5D
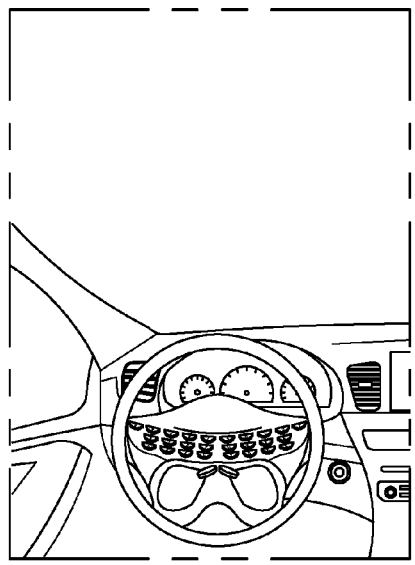
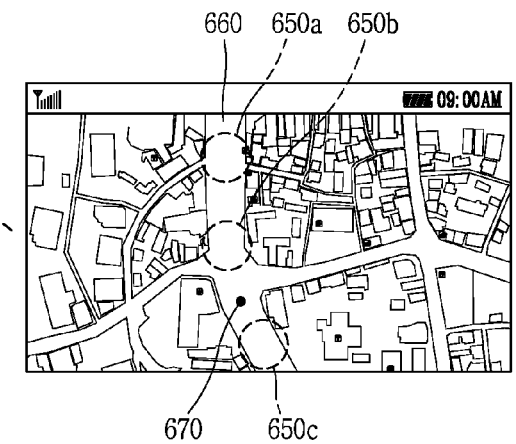
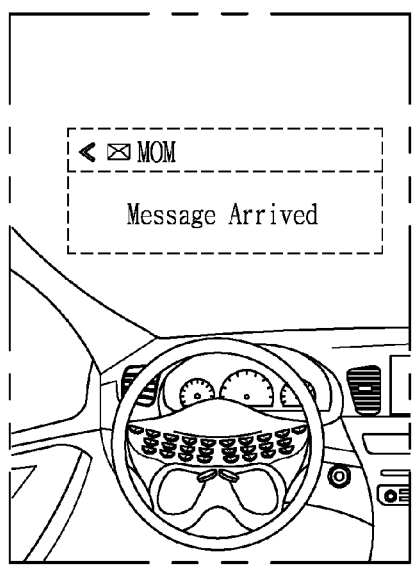
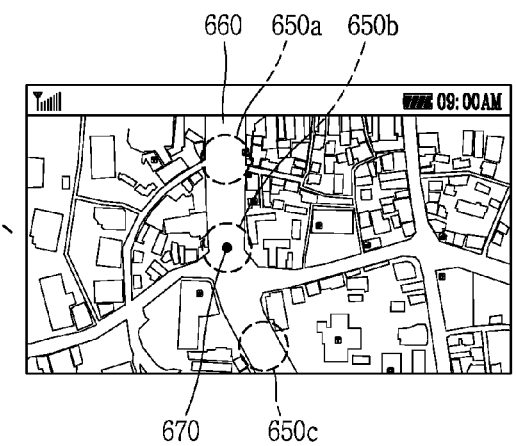

FIG. 8A
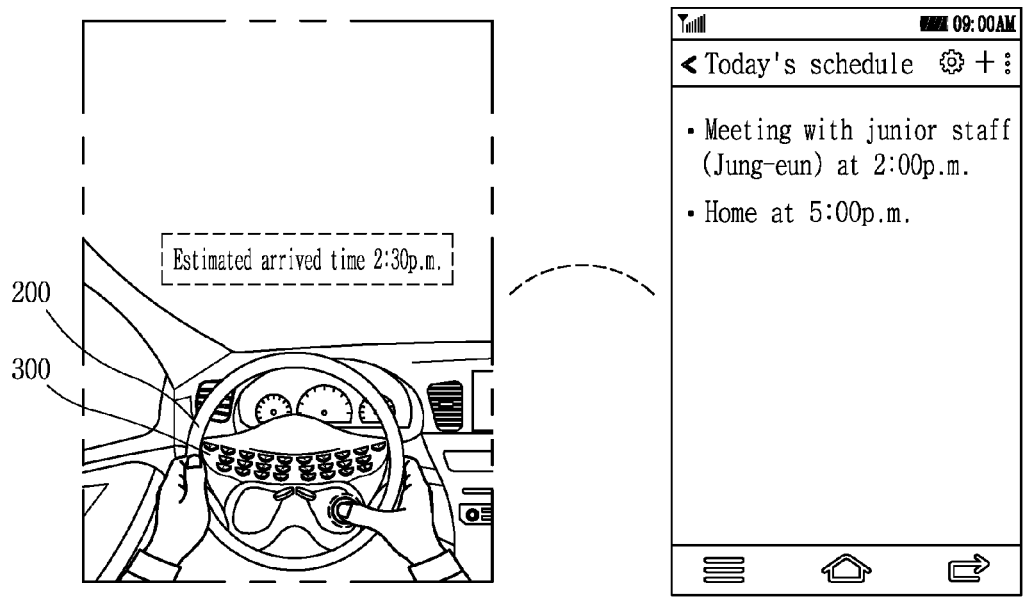
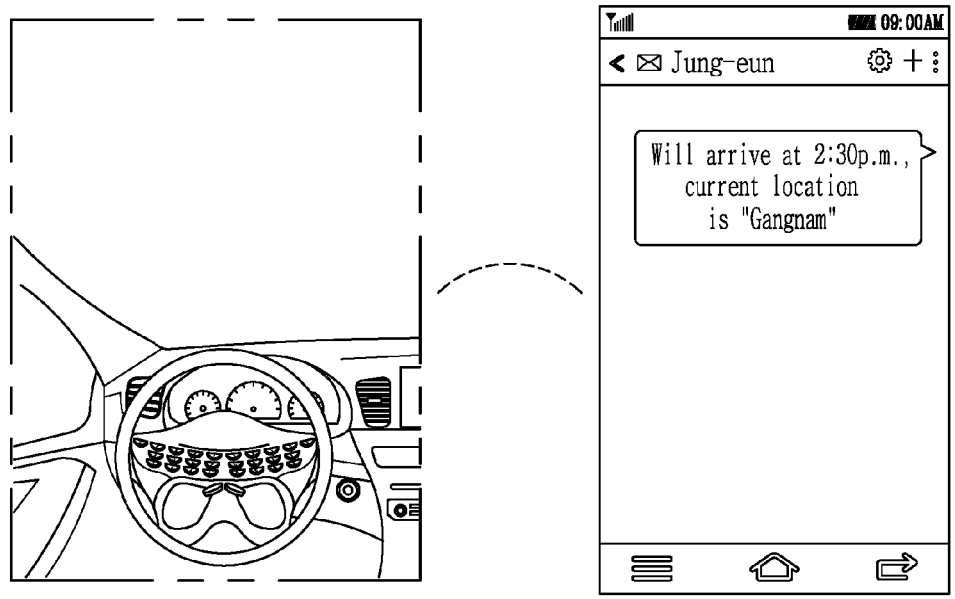

FIG. 8B
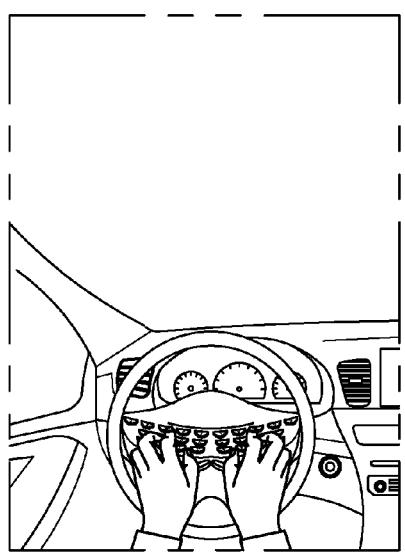 
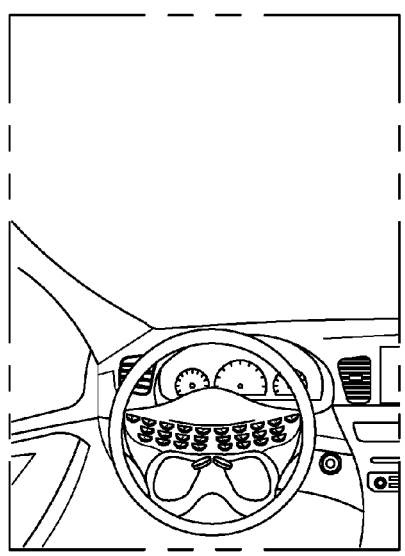 

VEHICLE AND CONTROL METHOD THEREOF

CROSS-REFERENCE TO RELATED APPLICATION

Pursuant to 35 U.S.C. §119(a), this application claims the benefit of earlier filing date and right of priority to Korean Application No. 10-2015-0066749, filed on May 13, 2015, the contents of which is incorporated by reference herein in its entirety.

BACKGROUND OF THE INVENTION

1. Field of the Invention

The present disclosure relates to a method for controlling an external device through a vehicle interworking with the external device.

2. Background of the Invention

Motor vehicles are convenient for transporting persons or things. Recently, interest in electronically-controlled smart cars (or smart automobiles) has increased. In more detail, smart cars provide various functions to users such as autonomous driving, user recognition, accident risk prevention, and the like.

Recently, a method for utilizing vehicles by interworking with various devices has been developed. For example, a vehicle and a mobile terminal can be connected to provide a function of playing media.

SUMMARY OF THE INVENTION

Therefore, an aspect of the detailed description is to provide a key input to an external device interworking with a vehicle through a keypad provided in a steering wheel of the vehicle.

Another aspect of the detailed description is to provide a method for creating a message received from a mobile terminal through a keypad provided in a steering wheel of a vehicle.

To achieve these and other advantages and in accordance with the purpose of this specification, as embodied and broadly described herein, a vehicle includes: a keypad configured to input a key; a display unit configured to output a character corresponding to a key input through the keypad; and a controller configured to control an input function through the keypad based on information related to driving of a vehicle, wherein the keypad is controlled to any one of an activation state in which input information is received and a deactivation state in which it is not possible to receive input information, based on the information related to driving of the vehicle.

To achieve these and other advantages and in accordance with the purpose of this specification, as embodied and broadly described herein, a vehicle interworking with an external device includes: a circular steering unit configured to move a wheel of the vehicle; a keypad disposed on the circular steering unit and configured to input a character; a display unit configured to output a character input through the keypad; and a controller configured to control an input function through the keypad based on information related to driving of the vehicle, wherein when an event occurs in the interworking external device, the controller may activate the keypad to perform a function related to the event based on the information related to driving of the vehicle.

To achieve these and other advantages and in accordance with the purpose of this specification, as embodied and broadly described herein, a method for controlling a vehicle interworking with an external device may include: sensing information relate to driving of a vehicle; and controlling an input function through a keypad disposed on a circular steering unit based on the information related to driving of the vehicle, wherein when an event occurs in the external device, the keypad is controlled to any one of an activation state in which input information is received and a deactivation state in which it is not possible to receive input information, based on the information related to driving of the vehicle.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 2 is a flow chart illustrating a method for controlling an input function of a keypad in a vehicle according to an embodiment of the present disclosure.

FIGS. 5A, 5B, 5C, and 5D are conceptual views illustrating a method for providing information related the use of a keypad to a user when an event occurs in a mobile terminal in a state in which a vehicle and the mobile terminal interwork with each other.

FIGS. 8A and 8B are conceptual views illustrating a method for processing information received from external devices by associating the information, when at least two or more external devices interwork with a vehicle.

DETAILED DESCRIPTION OF THE INVENTION

Figure 1A:
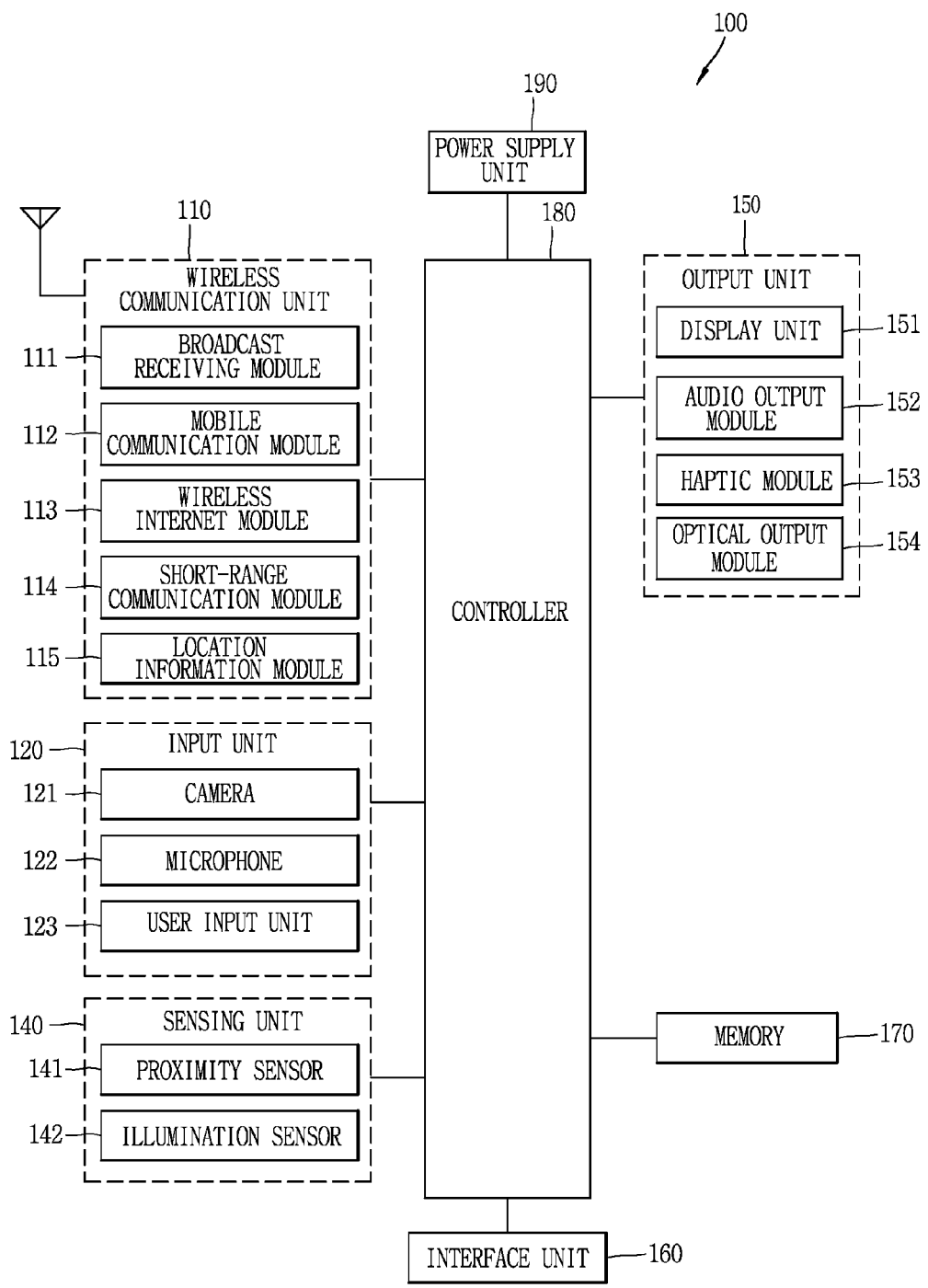
FIG. 1A is a block diagram illustrating a vehicle related to am embodiment of the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

The configuration according to exemplary embodiment described in this disclosure may be applied to a vehicle. Also, a person in the art will easily understood that the configuration can be applied to a fixed terminal such as a digital TV, desktop computer, digital signage, or the like.

The vehicle may include a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

The wireless communication unit 110 typically includes one or more modules which permit communications such as wireless communications between the vehicle and a wireless communication system, communications between vehicles, communications between the vehicle and an external server. Further, the wireless communication unit 110 typically includes one or more modules which connect the vehicle to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the vehicle and a user, as well as function as the user input unit 123 which provides an input interface between the vehicle and the user.

The interface unit 160 serves as an interface with various types of external devices that can be coupled to the vehicle. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the vehicle. For instance, the memory 170 may be configured to store application programs executed in the vehicle, data or instructions for operations of the vehicle, and the like. Some of these application programs may be downloaded from an external server via wireless communication. Other application programs may be installed within the vehicle at time of manufacturing or shipping, which is typically the case for basic functions of the vehicle (for example, receiving a call, placing a call, receiving a message, sending a message, and the like). It is common for application programs to be stored in the memory 170, installed in the vehicle, and executed by the controller 180 to perform an operation (or function) for the vehicle.

The controller 180 typically functions to control overall operation of the vehicle, in addition to the operations associated with the application programs. The controller 180 can provide or process information or functions appropriate for a user by processing signals, data, information and the like, which are input or output by the various components depicted in FIG. 1A, or activating application programs stored in the memory 170.

As one example, the controller 180 controls some or all of the components illustrated in FIG. 1A according to the execution of an application program that have been stored in the memory 170. In addition, in order to drive the application program, the controller 180 can combine two or more elements included in the vehicle to operate the same.

The power supply unit 190 can be configured to receive external power or provide internal power in order to supply appropriate power required for operating elements and components included in the vehicle. The power supply unit 190 may include a battery, and the battery may be an internal battery or a replaceable battery.

At least some of the components may cooperatively operate to implement an operation, controlling, or a control method of a mobile terminal according to various embodiments described hereinafter. Also, an operation, controlling, or a control method of the mobile terminal may be implemented in the mobile terminal by driving at least one application program stored in the memory 170.

Figure 1B:
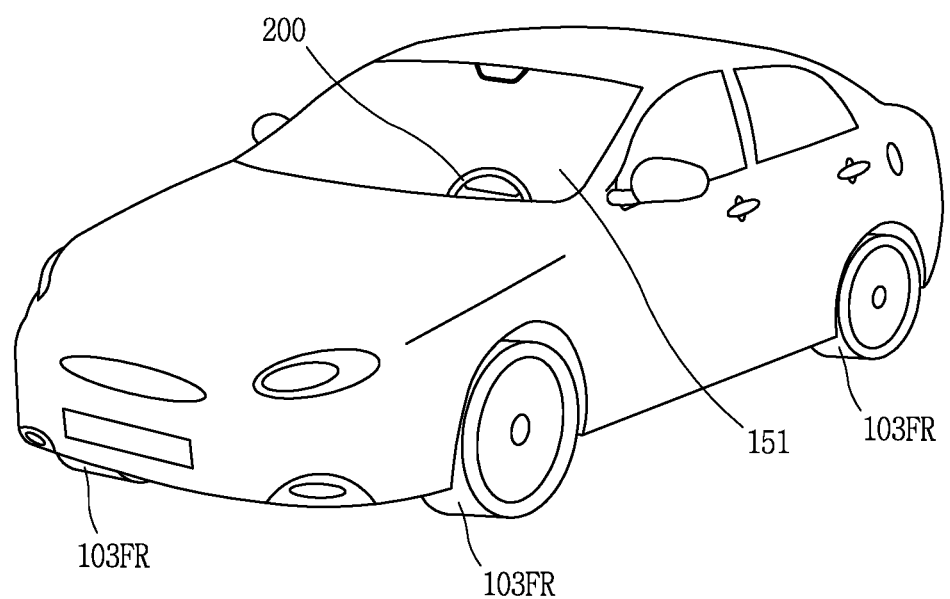
FIG. 1B is a view illustrating an external appearance of a vehicle.

FIG. 1B is a view illustrating an external appearance of a vehicle. The vehicle according to an embodiment of the present disclosure includes wheels 103FR, 103FL, and 103RL, a circular steering unit 200, and a display unit 151. The wheels 103FR, 103FL, and 103RL are rotated by power. The circular steering unit 200 is a user input unit for changing a direction of a wheel of the vehicle, and the display unit 151 may be a head up display reflected to a front glass of the vehicle.

Figure 3A:
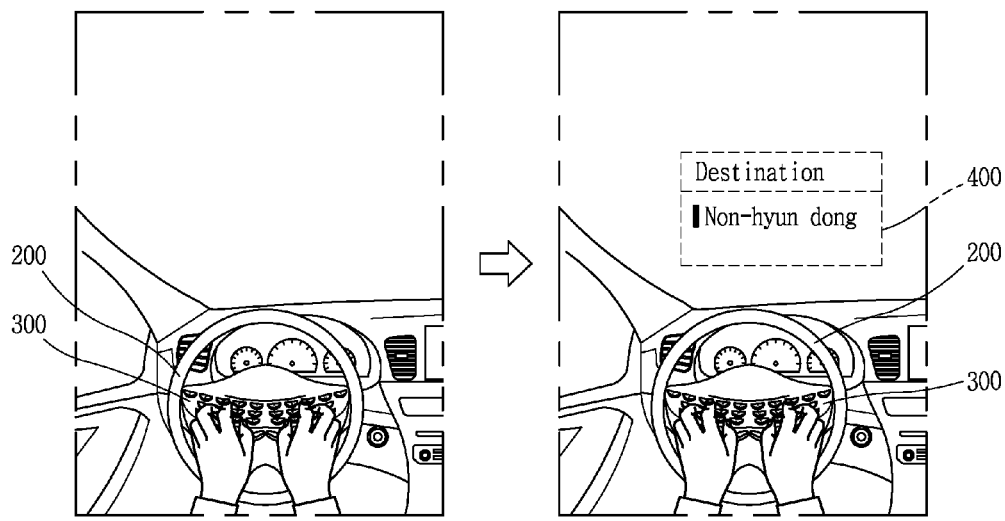
FIGS. 3A and 3B are conceptual views illustrating the control method of FIG. 2 in a vehicle according to an embodiment of the present disclosure.
Figure 3B:
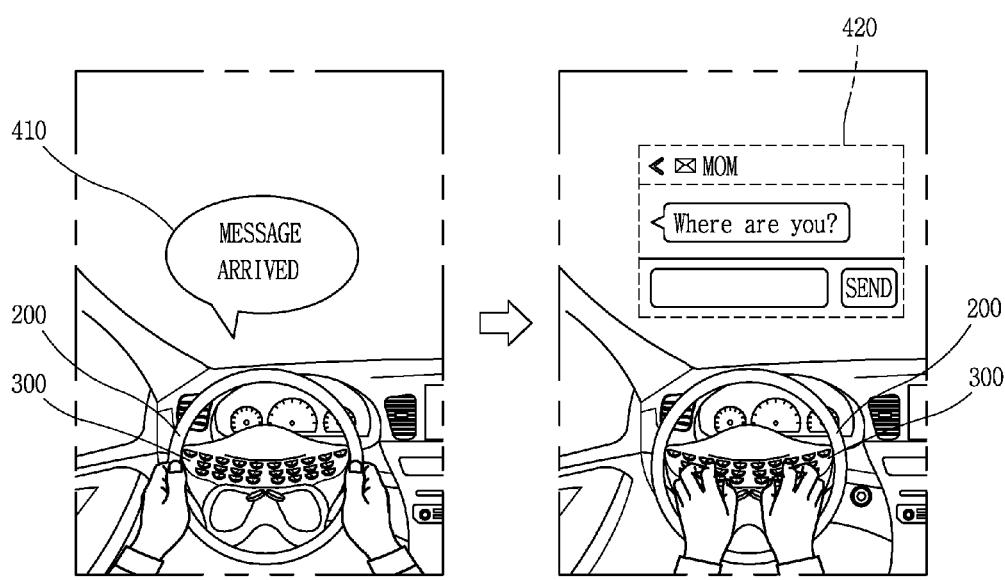

Hereinafter, a method for performing a key input through a keypad 300 provided in a vehicle including one or more of the components described above will be described. In particular, FIG. 2 is a flow chart illustrating a method for controlling an input function of the keypad 300 in a vehicle according to an embodiment of the present disclosure, and FIGS. 3A and 3B are conceptual views illustrating the control method of FIG. 2 in a vehicle according to an embodiment of the present disclosure.

The vehicle according to an embodiment of the present disclosure may include one or more of the components described above with reference to FIG. 1A. For example, the vehicle according to an embodiment of the present disclosure may include a keypad 300 to allow for a key input, a sensing unit 140 sensing information related to driving of a vehicle, a display unit 151, a wireless communication unit 110, and a controller 180.

The display unit 151 can be a head up display (HUD) projecting a virtual image on the front glass of the vehicle. The head up display projects a virtual image within a visible region of a driver. Thus, the head up display can provide required information to a driver even without a separate action.

Referring to FIG. 2, the vehicle according to an embodiment of the present disclosure receives information related to driving of the vehicle (S210). Further, the controller 180 of the vehicle can detect information related to an external environment of the vehicle or detect information related to components constituting the vehicle. That is, the information related to driving of the vehicle may include information related to the exterior of the vehicle and information related to the interior of the vehicle.

For example, the information related to the exterior of the vehicle includes information regarding a road on which the vehicle is currently driving (for example, road type information, road service area information, children protection zone information, and the like), traffic information (for example, traffic signal information, traffic volume information), and the like. In another example, the information related to the interior of the vehicle includes speed information, position information, parking/information, parking state information, and the like.

The controller 180 can detect information related to driving of the vehicle through at least one sensing unit provided in the vehicle, or detect information related to driving of the vehicle from an external device through communication. Further, the at least one sensing unit provided in the vehicle may include a proximity sensor sensing an object positioned in an area adjacent to the vehicle, and sensors sensing various components of the vehicle.

For example, the proximity sensor may include an infrared sensor, an image sensor (for example, a camera), a laser sensor, a light detecting and ranging (lidar) sensor, and the like. In another example, the sensors sensing various components of the vehicle may include an air flow sensor (AFS), an intake air temperature sensor (ATS), a barometric pressure sensor (BPS) sensor, a water temperature sensor (WTS), a position sensor, an oxygen sensor, and the like.

The vehicle according to an embodiment of the present disclosure may further include a communication unit wirelessly performing communication wiredly or wirelessly in order to communicate with an external device. In more detail, the communication unit may include at least one of a mobile communication module 112, a wireless Internet module 113, and a position information module 114.

Also, the mobile communication module 112, the wireless Internet module 113, and the position information module 114 may perform the same role as that described above with reference to FIG. 1A. For example, the controller 180 can access an external server related to a traffic situation through the wireless Internet module 113 and receive traffic situation information from the external server.

After receiving the information related to driving of the vehicle, the vehicle according to an embodiment of the present disclosure interworks with an external device (S220). In order to perform short range communication with an external device, the vehicle according to an embodiment of the present disclosure may further include a short range communication module 115.

The short range communication module 115 is a device for communicating with an external device positioned in an area adjacent to the vehicle. That is, the vehicle may communicate with the external device 9 for example, a navigation device, a mobile terminal, and the like) positioned within an adjacent area through the short range communication module 115. Hereinafter, performing communication with the external device positioned within the adjacent area may be interpreted as interworking with the external device. External devices that can interwork with the vehicle may be termed nomadic devices.

The short range communication module 114 is provided for short range communication and supports short range communication using at least one of Bluetooth, radio frequency identification (RFID), infrared data association (IrDA), ultra wide band (UWB), ZigBee, near field communication (NFC), wireless-fidelity (Wi-Fi), Wi-Fi direct, wireless universal serial bus (USB) technologies. The short range communication module 114 may support wireless communication between the vehicle and a wireless communication system, between the mobile terminal 100 and the vehicle, or between the vehicle and a network in which a different mobile terminal is positioned though a wireless area network. The wireless area network may be a wireless personal area network.

In addition, the different mobile terminal may be a wearable device (for example, a smartwatch, a smart glass, or a head mounted display) which can exchange data with the vehicle according to an embodiment of the present disclosure. The short range communication module 114 can detect (or recognize) a wearable device that can communicate with the vehicle, around the vehicle. In addition, when the detected wearable device is a device authenticated to communicate with the vehicle according to an embodiment of the present disclosure, the controller 180 can transmit at least a portion of data processed in the vehicle to the wearable device through the short range communication module 114. Thus, the user of the wearable device may use data processed in the vehicle, through the wearable device.

In addition, the external device may be an external device on which authentication of identification information has been completed between the vehicle and the external device. In more detail, the controller 180 can transmit identification information to the external device through the short range communication module. The identification information may be unique information of the vehicle, which may distinguish the vehicle from other vehicles. For example, the identification information may be a registration number, a manufacturer's serial number.

When the identification information is received from the vehicle, the external device may permit short range communication with the vehicle. When the short range communication is permitted, authentication with the external device has been completed.

Conversely, the vehicle may receive identification from the external device and permit the external device to perform short range communication. Also, in this instance, authentication between the vehicle and the external device has been completed. The external device may newly perform authentication whenever it attempts to interwork with the vehicle, or after authentication is performed once, the external device may immediately interwork with the vehicle without an authentication procedure later.

When the vehicle interworks with the external device, the controller 180 can perform functions that can be executed in the external device, in the vehicle instead. For example, when the vehicle interworks with a mobile terminal, the controller 180 can execute a message transmission function that is executed in the mobile terminal, in the vehicle instead. In another example, when the vehicle interworks with a navigation device, the controller 180 can perform a way finding function that may be executed in the navigation device, in the vehicle instead.

Also, when the vehicle interworks with the external device, the controller 180 can input information of functions being executed in the external device, through the vehicle. For example, as illustrated in FIG. 3A, when the vehicle interworks with the navigation device, the controller 180 can transmit destination information to the navigation device. In another example, as illustrated in FIG. 3B, when the vehicle interworks with a mobile terminal, the controller 180 can transmit contents of a message to the mobile terminal.

When at least one external device interworks with the vehicle, the controller 180 can determine a function to be executed in the vehicle based on information related to driving of the vehicle. For example, as illustrated in FIG. 3A, when it is detected that the vehicle has just started and an input is applied through the keypad 300, the controller 180 can determine a function to be executed in the vehicle, as a function for transmitting destination information to the navigation device interworking with the vehicle.

In addition, when the vehicle has started is detected, and when a user's hand is sensed in a position adjacent to the keypad, the controller 180 can execute the determined function. For example, as illustrated in FIG. 3A, when the user's hand is detected in a region adjacent to the keypad, the controller 180 can execute a function for transmitting the destination information. Steps S210 and S220 may be performed in reverse order or may be performed simultaneously.

Meanwhile, step S220 can be omitted according to circumstances. For example, when a message can be transmitted and received and the navigation function can be performed in the vehicle without interworking with an external device, step S220 may be omitted.

The vehicle can control an input function of the key pad 300 to allow information to be transmitted to an external device that interworks with the vehicle to be input, based on information related to driving of the vehicle (S230). Further, the vehicle according to an embodiment of the present disclosure may further include the keypad 300 capable of receiving a key input.

In particular, the keypad 300 is a user input unit capable of receiving a key input and may include both a soft keypad and a hard keypad. The soft keypad may be a keypad formed to receive a key input through a touch, and the hard keypad may be a keypad formed to receive a key input through a button.

The keypad 300 may include at least one key. Also, the key may be formed to input one or more characters. For example, the keypad 300 may include a number, a character, a special character, a symbol, a direction key, and a function key. Also, the keypad 300 may be configured to have various forms. For example, in the keypad 300, keys may be disposed in a Qwerty pad form. In addition, the keypad 300 can be provided in various forms according to a design of a vehicle provider.

Also, the keypad 300 may be installed in a driving operation unit of the vehicle to allow the user to conveniently drive the vehicle and perform inputting on the keypad 300. The driving operation unit may be a component for the user to directly input a control command for driving the vehicle. The driving operation unit may include a circular steering unit 200, a transmission, a brake, and an accelerator. for example, the keypad 300 may be installed on the circular steering unit of the vehicle. In this instance, the user can conveniently perform key input through the keypad 300 while operating the circular steering unit 200.

Also, as well as in the driving operation unit, the keypad 300 may also be disposed in a position at which the user can conveniently operate the vehicle and conveniently perform key input. The controller 180 can control an input function of the keypad 300 based on information related to driving of the vehicle. In more detail, the controller 180 can activate or deactivate the keypad 300 based on information related to driving of the vehicle.

Activation of the keypad 300 refers to when the user can perform key input though the keypad 300. In this instance, the controller 180 can display information input through the keypad 300 on the display unit 151. Conversely, deactivation of the keypad 300 refers to when a key input through the keypad 300 is limited. In this instance, even though a user input is applied to the keypad 300, the controller 180 does not display a character corresponding to the user input on the display unit 151.

Further, the controller 180 can control the keypad 300 to any one of an activation state or deactivation state based on information related to driving of the vehicle. That is, the controller 180 can measure a degree of risk of inputting of the key pad 300 based on information related to driving of the vehicle. The degree of risk of inputting of the keypad 300 may refer to a degree of traffic accident risk due to inputting of the keypad 300.

In this instance, when a degree of risk of inputting the keypad 300 is low, the controller 180 can control the keypad 300 to be in an activation state, and when a degree of risk of inputting the keypad 300 is high, the controller 180 can control the keypad 300 to be in a deactivation state. For example, when the vehicle is waiting for the light to change, when a speed of the vehicle is lower than a preset speed, in case of traffic congestion, when the vehicle is parked, or when a road in which the vehicle is currently positioned is a straight road, the controller 180 can determine that a degree of risk of inputting on the keypad 300 is low.

In another example, when a speed of the vehicle is equal to or higher than a preset speed, when the vehicle is running, or when a road in which the vehicle is currently positioned is a curve or a sloping road, the controller 180 can determine that a degree of risk is high. That is, in an embodiment of the present disclosure, a degree of risk of driving can be reduced by limiting user input of the keypad 300 based on information related to driving of the vehicle.

Further, when the keypad 300 is a soft keypad in which a key input is performed by a touch input, the soft keypad can be displayed on the display unit provided in the vehicle. For example, the soft keypad can be displayed on the display unit disposed on the circular steering unit 200 of the vehicle.

In addition, according to whether the soft keypad is activated, the controller 180 can determine whether to display the soft keypad. In more detail, when the soft keypad is in a deactivated state, the controller 180 cannot display the soft keypad on the display unit 151. Conversely, when the soft keypad is in an activated state, the controller 180 can display the soft keypad on the display unit 151.

Also, the controller 180 can set an input time and an input character amount of the keypad 300 based on information related to driving of the vehicle. The input time may be a time during which the keypad 300 is maintained in the activated state, and when the input time has lapsed, the keypad 300 may be deactivated. The input character amount may refer to the number of characters that may be input through the keypad.

For example, when the vehicle is waiting for the light to change, and when the keypad 300 is activated, the controller 180 can set an input time of the keypad 300 to correspond to a time for waiting for the light to change. In another example, when the keypad 300 is activated while the vehicle is driving, the controller 180 can limit the input character amount of the keypad 300.

Also, the controller 180 can set the input time and the input character amount based on a degree of risk of inputting of the keypad 300. For example, when a degree of risk of inputting the keypad 300 is high, the controller 180 can set the input time to one hour, and when a degree of risk of inputting the keypad 300 is low, the controller 180 can set the input time to two hours longer than one hour. In another example, when a degree of risk of inputting the keypad 300 is high, the controller 180 can set the input character amount to a first amount, and when a degree of risk of inputting the keypad 300 is low, the controller 180 can set the input character amount to a second amount.

Also, when the keypad 300 is activated, and when information related to driving of the vehicle is changed, the controller 180 can deactivate the keypad 300. Similarly, when the keypad 300 is deactivated, and when information related to driving of the vehicle is changed, the controller 180 can activate the keypad 300.

For example, after activating the keypad 300 based on halt information of the vehicle, and when driving of the vehicle is detected, the controller 180 can deactivate the keypad 300. In another example, after activating the keypad 300 based on driving information of the vehicle, when halt of the vehicle is detected, the controller 180 can deactivate the keypad 300.

When the keypad 300 is switched from the activation state to the deactivation state, the controller 180 can activate a voice recognition function to input information input through the keypad 300 by voice. In this instance, the controller 180 can convert a voice recognized through the voice recognition function into text, and display the converted text on the display unit 151.

For example, while contents of a message is being input through the keypad 300, when the keypad 300 is deactivated, the controller 180 can continuously input contents of the message through voice recognition. Thus, when input of the keypad 300 is limited due to driving of the vehicle, the information can be continuously input using the voice recognition function even without a separate control command.

Further, when the keypad 300 is switched from a deactivated state to an activated state, the controller 180 can output notification information indicating that inputting is available through the keypad 300, on the display unit 151. Also, according to whether the keypad 300 is activated, the controller 180 can determine whether to activate a function of using information input through the keypad 300 as input information. That is, the controller 180 can determine whether a function related to information input through the keypad 300 is to be activated through the keypad 300, as well as activation of the keypad 300.

In addition, deactivation of a function refers to stopping or limiting an execution related to the function. Also, when a function is deactivated, an execution screen of the function may not be displayed on the display unit 151 any longer. Conversely, activation of a function refers to an execution of the function and displaying an execution screen of the function on the display unit 151.

For example, when the keypad 300 is activated and a message input function is executed, and then the keypad 300 is deactivated, the controller 180 can also deactivate the message input function. In this instance, the controller 180 can make the execution screen of the message input function disappear from the display unit 151. That is, an input function of the keypad 300 is limited and execution of a function related to input of the keypad 300 is limited together, whereby a degree of risk of an accident can be lowered.

In another example, when the keypad 300 in a deactivated state is activated, the controller 180 can execute again a function which was being executed before the keypad 300 was deactivated. For example, the keypad 300 is deactivated while a message input function is being executed, and thereafter, when the keypad 300 is activated again, the controller 180 can activate the message input function again.

In this instance, when the keypad 300 is activated again, an execution screen of the message input function may be displayed on the display unit 151.

That is, when the activation state and the deactivation state of the keypad 300 are switched according to driving of the vehicle, a function related to the keypad 300 may also be switched between the activation state and the deactivation state. Also, the controller 180 can transmit information input through the keypad 300 to at least one external device interworking with the vehicle. That is, the vehicle may transmit information input through the keypad 300 to at least one external device so that the information may be used in the at least one external device.

In addition, when a plurality of external devices interwork with the vehicle, the controller 180 can transmit information input through the keypad 300 to at least one of the plurality of external devices. In addition, the at least one external device which is to receive the information input through the keypad 300 may be selected by the user or based on a preset condition.

When the at least one external device which is to receive the information input through the keypad 300 is selected by the user, the controller 180 can display a device list including an item indicating the plurality of external devices interworking with the vehicle on the display unit 151. In this instance, the controller 180 can select at least one external device from the device list based on a user selection, and may transmit the information input through the keypad 300 to the at least one external device.

When at least one external device which is to receive the information input through the keypad 300 is selected based on a preset condition, the controller 180 can extract at least one external device for receiving the information input through the keypad 300 from the plurality of external devices, based on the preset condition.

The preset condition may be a condition related to driving of the vehicle, a condition related to contents of information input through the keypad 300, or a condition related to occurrence of an event of the external device. For example, the preset condition may be a condition related to a point in time at which the vehicle starts to drive or a condition in which an event occurs in the external device that interworks with the vehicle. The event may refer to various events that may occur in the external device, such as an event in which a call signal is received, an event in which a message is received, or an event in which notification information according to preset schedule information is generated.

For example, as illustrated in FIG. 3A, the controller 180 can determine information input through the keypad 300 within a preset period of time after the vehicle is started, as destination information 400 of navigation device, and transmit the information as the destination information to the interworking navigation device. In another example, as illustrated in FIG. 3B, when a message is received by a mobile terminal that interworks with the vehicle while the vehicle is driving, the controller 180 can output notification information regarding the message reception by voice 410.

After outputting the notification information, when information is input through the keypad 300, the controller 180 can transmit the input information as message information 420 to the mobile terminal. Meanwhile, when at least two external devices are extracted according to the preset condition, the controller 180 can output a device list including an item representing the at least two external devices on the display unit 151 so that whether the information input through the keypad 300 is to be transmitted to both of the at least two external devices or to only at least one of the at least two external devices may be determined according to a user selection.

In the above, the method for controlling an input function of the keypad 300 such that information to be transmitted to an external device is input based on information related to driving of the vehicle which interworks with the external device has been described. Thus, in an embodiment of the present disclosure, a function related to an external device can be performed through the keypad 300 of the vehicle, without having to directly control the external device while the vehicle is driving.

Figure 4A:
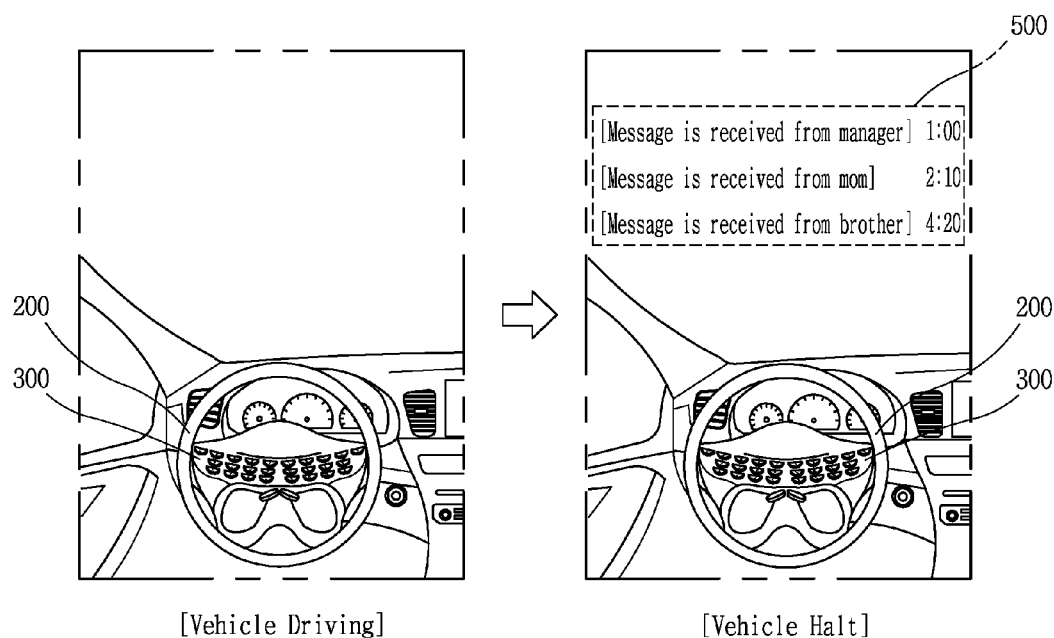
FIGS. 4A and 4B are conceptual views illustrating whether to notify about an event which has occurred in a mobile terminal interworking with a vehicle.
Figure 4B:
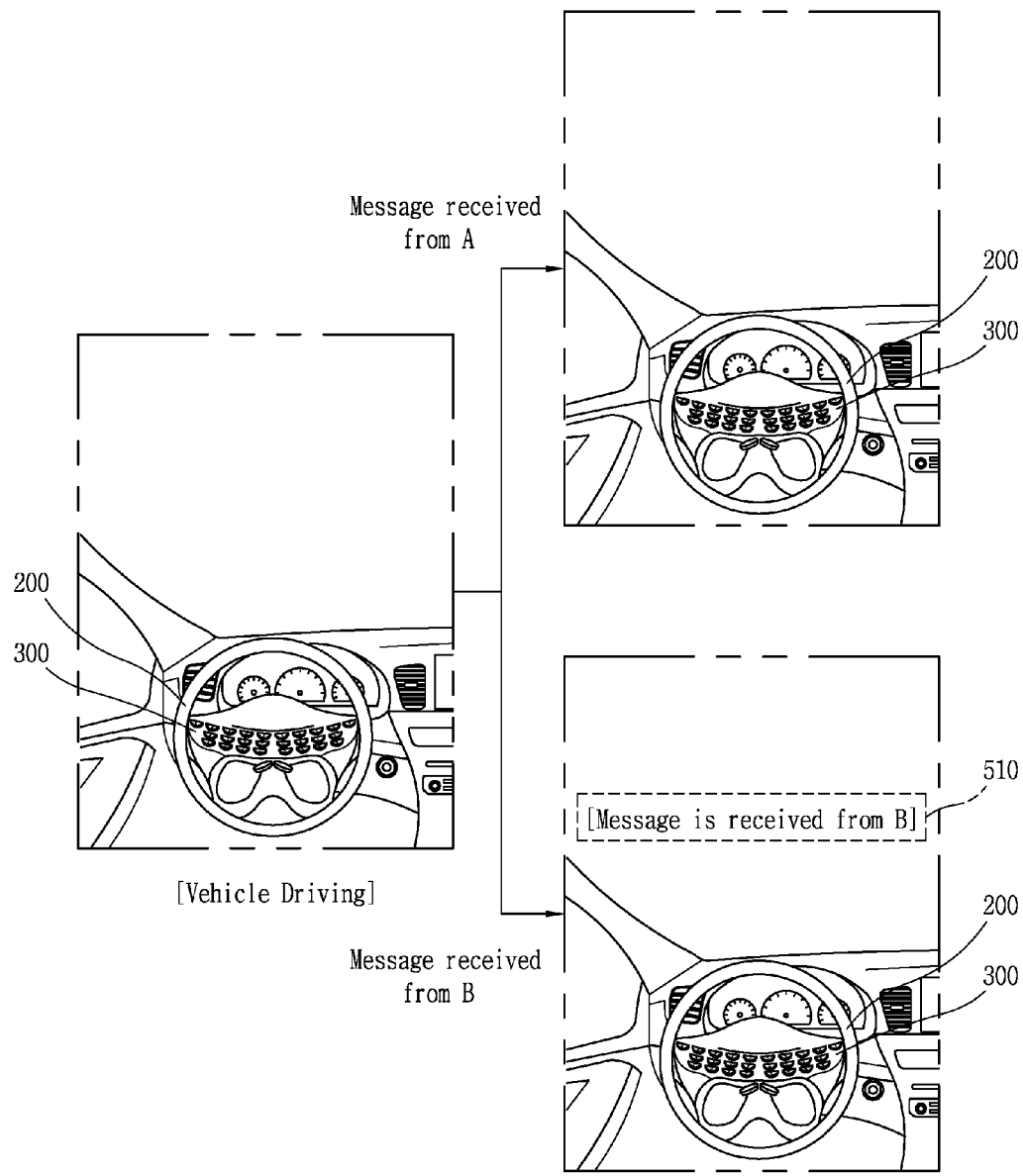

Hereinafter, a method for determining whether occurrence of an event is to be notified when an event occurs in a mobile terminal that interworks with a vehicle will be described. In particular, FIGS. 4A and 4B are conceptual views illustrating a method for providing notification related to an event which occurs in a mobile terminal interworking with a vehicle.

The vehicle according to an embodiment of the present disclosure may interworking with a mobile terminal through a short range communication module. In addition, while the vehicle is driving, the vehicle may inform the user about an event that occurs in the interworking mobile terminal. The event may be an event that a call signal is received from a different mobile terminal, an event in which a message is received, an event in which previously stored notification information is generated, and the like.

When an event occurs in the mobile terminal, the controller 180 of the vehicle may output notification information indicating the occurrence of the event. The notification information indicating the occurrence of the event may be output according to at least one of visual, audible, and tactile schemes Also, the controller 180 can determine whether to output the notification information indicating the occurrence of the event based on information related to driving of the vehicle. In more detail, when the vehicle is driving, the controller 180 can limit outputting of the notification information indicating the occurrence of the event in order to prevent a risk of an accident.

Also, when the vehicle is parked or halted, the controller 180 can determine that a risk of an accident is low, and output notification information indicating the occurrence of the event. For example, as illustrated in the first drawing of FIG. 4A, when the vehicle is driving, even though occurrence of an event in the mobile terminal is detected, the controller 180 can limit outputting of notification information indicating the occurrence of the event.

Limiting outputting of the notification information refers to not outputting notification information, providing only a minimum notification, or outputting only notification information regarding an event satisfying a preset condition. For example, when a speed of the vehicle is equal to or lower than a preset speed, the controller 180 can output simple notification information indicating occurrence of an event, and when a speed of the vehicle is higher than the preset speed, the controller 180 can not output notification information indicating the occurrence of the event.

The preset condition may be an event is received from a specific external terminal and when a specific word is included in contents of a message. For example, as illustrated in FIG. 4B, while the vehicle is driving, the controller 180 can output notification information 510 regarding a message received from an external terminal set to "B" and not output notification information regarding a message received from an external terminal set to "A". In another example, the controller 180 can output notification information regarding a message including a word of "meeting".

Also, when the vehicle is halted, the controller 180 can output notification information indicating the occurrence of the event. For example, as illustrated in the second drawing of FIG. 4A, the controller 180 can display notification information indicating that there is a message received from the mobile terminal on the display unit 151. Also, the controller 180 can also output an event which has been prevented from being output due to driving of the vehicle. In addition, the controller 180 can display messages received from the mobile terminal in reception time order.

Further, when the notification information indicating the occurrence of the event is output, the controller 180 can set the keypad 300 to an activation state. That is, when the notification information indicating the occurrence of the event is output, the controller 180 can activate the keypad 300 to control a function related to the event. Thus, the present disclosure provides a method for performing a function related to the notification information through the keypad 300, when the notification information is output.

For example, when notification information indicating occurrence of a message is output, the controller 180 can activate the keypad 300, input contents of a message or make contents of the message disappear from the display unit 151 based on a control command input through the keypad 300.

Also, when outputting of notification information indicating occurrence of the event is limited based on information related to driving of the vehicle, the controller 180 can also limit a degree of activation of the keypad 300. A degree of activation of the keypad may include a first activation degree enabling input of the entire keypad and a second activation degree partially activating the keypad.

For example, when only simple notification information is output based on information related to driving of the vehicle, the controller 180 can partially activate a key for performing a simple function (for example, a space bar or enter key) in the keypad 300. In another example, when contents of a message is displayed based on information related to driving of the vehicle, the controller 180 can entirely activate the keypad.

Also, even while the vehicle is driving, the controller 180 can output contents of a message received from a specific terminal. When contents of a message received from a specific terminal is displayed, the controller 180 can activate the keypad 300 by limiting at least one of an input time and an input information amount of the keypad based on information related to the driving. For example, when a speed of the vehicle is a first speed, the controller 180 can limit the input time to 20 seconds, and when a speed of the vehicle is a second speed faster than the first speed, the controller 180 can limit the input time to 10 seconds.

Thus, notification information indicating that an event occurs in the interworking external device can be provided while the vehicle is driving. Also, by limiting output of notification information indicating occurrence of an event, a risk of an accident can be reduced.

Hereinafter, a method for providing information related to the use of a keypad to the user when an event occurs in a mobile terminal when the vehicle interworks with the mobile terminal will be described. In particular, FIGS. 5A to 5D are conceptual views illustrating a method for providing information related the use of a keypad to a user when an event occurs in a mobile terminal while a vehicle and the mobile terminal interwork with each other.

When the vehicle interworks with a mobile terminal, and when an event occurs in the mobile terminal, the vehicle can provide contents related to the event. For example, when a message is received by the mobile terminal, the controller 180 of the vehicle can control the display unit 151 to display contents of the message. In addition, when contents related to the event is provided, the controller 180 can set the keypad 300 to an activation state such that a function related to the event can be executed. Also, when contents related to the event are not provided, the controller 180 can deactivate the keypad 300 so that input through the keypad is limited.

Further, based on information related to driving of the vehicle, the controller 180 can determine an output scheme, an output form, and an output available point of the contents of the event. First, the controller 180 can output contents of the event according to at least one of visual, audible, and tactile schemes. Information related to driving of the vehicle may include information regarding whether there is a fellow passenger in the vehicle, a speed of the vehicle, a position of the vehicle, and a road type.

Whether there is a fellow passenger or not may be detected through a sensor provided in the vehicle. For example, an infrared sensor may be provided within the vehicle, and the controller 180 can determine whether there is a fellow passenger or not through the infrared sensor. For example, the controller 180 can determine whether to output a message in an audible manner according to whether there is a fellow passenger or not in the vehicle.

Figure 5A:
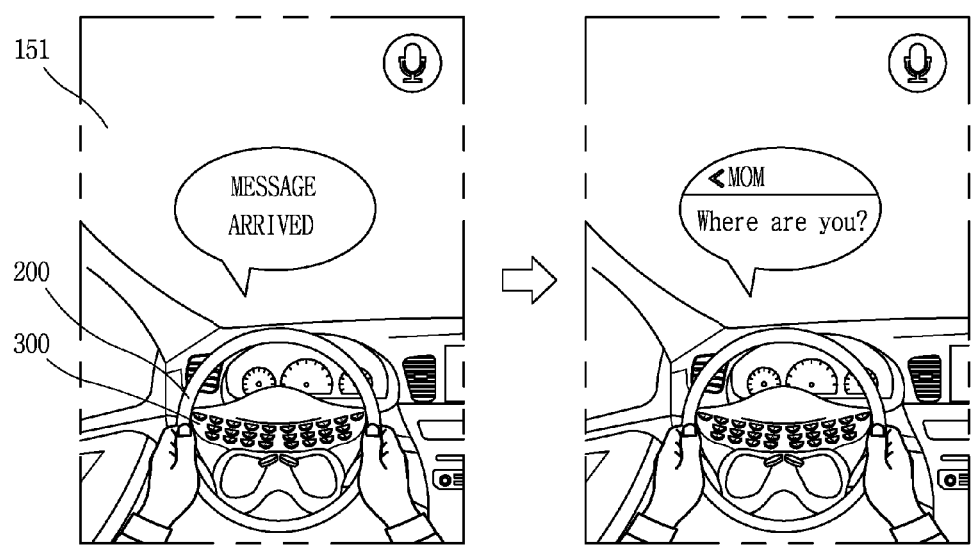

In more detail, as illustrated in FIG. 5A, when there is no fellow passenger in the vehicle, the controller 180 can output the contents of the message by voice. Further, when there is a fellow passenger in the vehicle, the controller 180 can not output the contents of the message by voice. In this instance, the controller 180 can visually output the contents of the message on the display unit 151.

When the contents of the message are output by voice, the controller 180 can activate a voice recognition function such that the contents of the message can be recognized by voice. That is, in this instance, the controller 180 can activate the voice recognition function, instead of activating the keypad 300.

In another example, when a speed of the vehicle is lower than a preset speed, the controller 180 can display contents of the message on the display unit 151. Further, when the speed of the vehicle exceeds the preset speed, the controller 180 can not display the contents of the message on the display unit 151. In addition, the controller 180 can output the contents of the message in an audible manner, while limiting visual output of the contents of the message.

Also, when the contents of the message are displayed on the display unit 151, the controller 180 can activate the keypad 300 such that a function related to the message can be performed. Further, the controller 180 can limit output of the contents of the event based on information related to driving of the vehicle. For example, when the vehicle is driving, the controller 180 can limit output of the contents of the event.

Limiting the output of contents of the event include when the contents of the event are not entirely displayed and when only simple information of the contents of the event is displayed. In addition, the controller 180 can determine a degree of activation of the keypad according to a degree of limiting output of the contents of event. For example, when not all of the contents of the event are displayed, the controller 180 can deactivate all the keys of the keypad, and when only simple information of the contents of the event is displayed, the controller 180 can deactivate only at least partial keys of the keypad.

Also, when limited output of the contents of the event is switched to when contents of the event can be displayed, the controller 180 can provide notification information so that the user can select whether to display the contents of the event. For example, as illustrated in the first drawing of FIG. 5B, when a message is received while the vehicle is driving, the controller 180 can output notification information 600 indicating the message reception by voice, and not display contents of the message on the display unit 151. In addition, as illustrated in the second drawing of FIG. 5B, when it is detected that the vehicle is halted, the controller 180 can output notification information 610 informing the user that contents of the received message can be output, on the display unit 151. Accordingly, the user can recognize the presence of the received message while the vehicle is driving, and in addition, the user can know that the contents of the current message may be checked.

As illustrated in the third drawing of FIG. 5B, after the notification information 610 is displayed, the controller 180 can output contents 620 of the message on the display unit 151 based on a user request. Also, when contents of the event is displayed, the controller 180 can determine a degree of risk of inputting keypad based on information related to driving of the vehicle, and may determine an output form of the contents of the event based on the degree of risk of inputting the keypad. The output form may include a color, a light and shade, an animation effect, and the like.

Figure 5C:
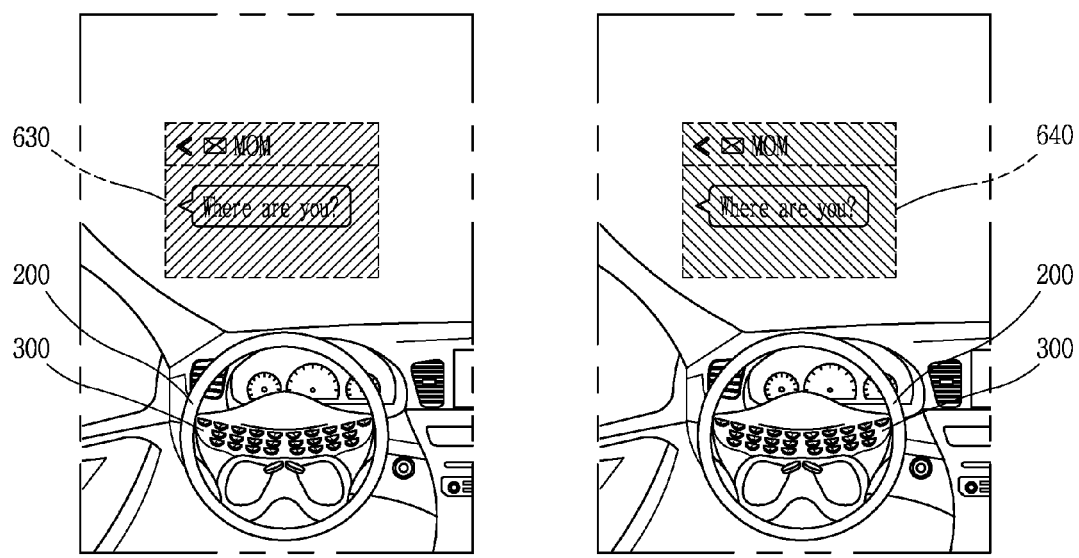

As illustrated in the first drawing of FIG. 5C, when a message is output while the vehicle is driving, the controller 180 can determine that a degree of risk of inputting the keypad is high, and display the output message in a red color. Further, as illustrated in the second drawing of FIG. 5C, when the message is output while the vehicle is halted, the controller 180 can determine that a degree of risk of inputting the keypad is low, and display the output message in a green color. For example, when a speed of the vehicle is a first speed, the controller 180 can display the output message in a red color, and when the speed of the vehicle is a second speed faster than the first speed, the controller 180 can display the output message in a green color.

Also, based on driving route information of the vehicle, the controller 180 can output contents of the event in a spot in which a degree of risk of inputting the keypad is low. In more detail, as illustrated in the first drawing of FIG. 5D, when a driving route 660 is set between a starting point and a destination on the navigation device interworking with the vehicle, the controller 180 can receive position information 650a, 650b, and 650c with low degree of risk of inputting the keypad in the driving route from the navigation device. The positions 650a, 650b, and 650c with a low degree of risk of inputting the keypad are positions determined to have a low degree of risk of an accident, which may be a straight road, a road with a speed limit, or a location of a service area.

As illustrated in the second drawing of FIG. 5D, when a current position 670 of the vehicle corresponds to any one of the positions 650a, 650b, and 650c with a low degree of risk of inputting the keypad, the controller 180 can output the contents of the event. In addition, the controller 180 can not output the contents of the event in a position other than the position with a low degree of risk of inputting the keypad.

Also, the controller 180 can activate the keypad 300 in a position with a low degree of risk of inputting the keypad.

Further, the controller 180 can deactivate the keypad 300 in a position other than the position with a low degree of risk of inputting the keypad.

So far, the method for providing contents of an event that occurs in the interworking mobile terminal through the vehicle and executing a related function has been described. Thus, the output of the contents related to an event and activation of the keypad 300 can be cooperatively operated. Hereinafter, a method for activating the keypad based on a driving state of the vehicle will be described. In particular, FIGS. 6A to 6C are conceptual views illustrating a method for activating a keypad 300 based on a driving state of a vehicle.

The controller 180 of the vehicle according to an embodiment of the present disclosure can determine whether to activate the keypad 300 based on information related to driving of the vehicle. In addition, when the keypad is deactivated, and when a user input is applied to the keypad 300, the controller 180 can output notification information indicating that the keypad 300 is in a deactivated state on the display unit 151.

Figure 6A:
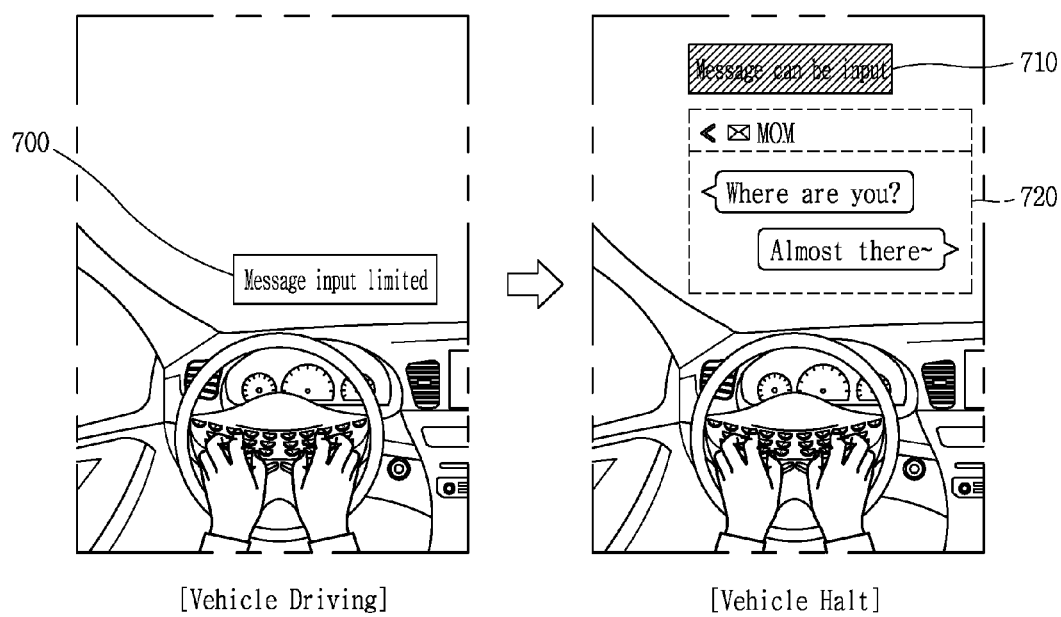
FIGS. 6A, 6B, and 6C are conceptual views illustrating a method for activating a keypad 300 based on a driving state of a vehicle.
Figure 6B:
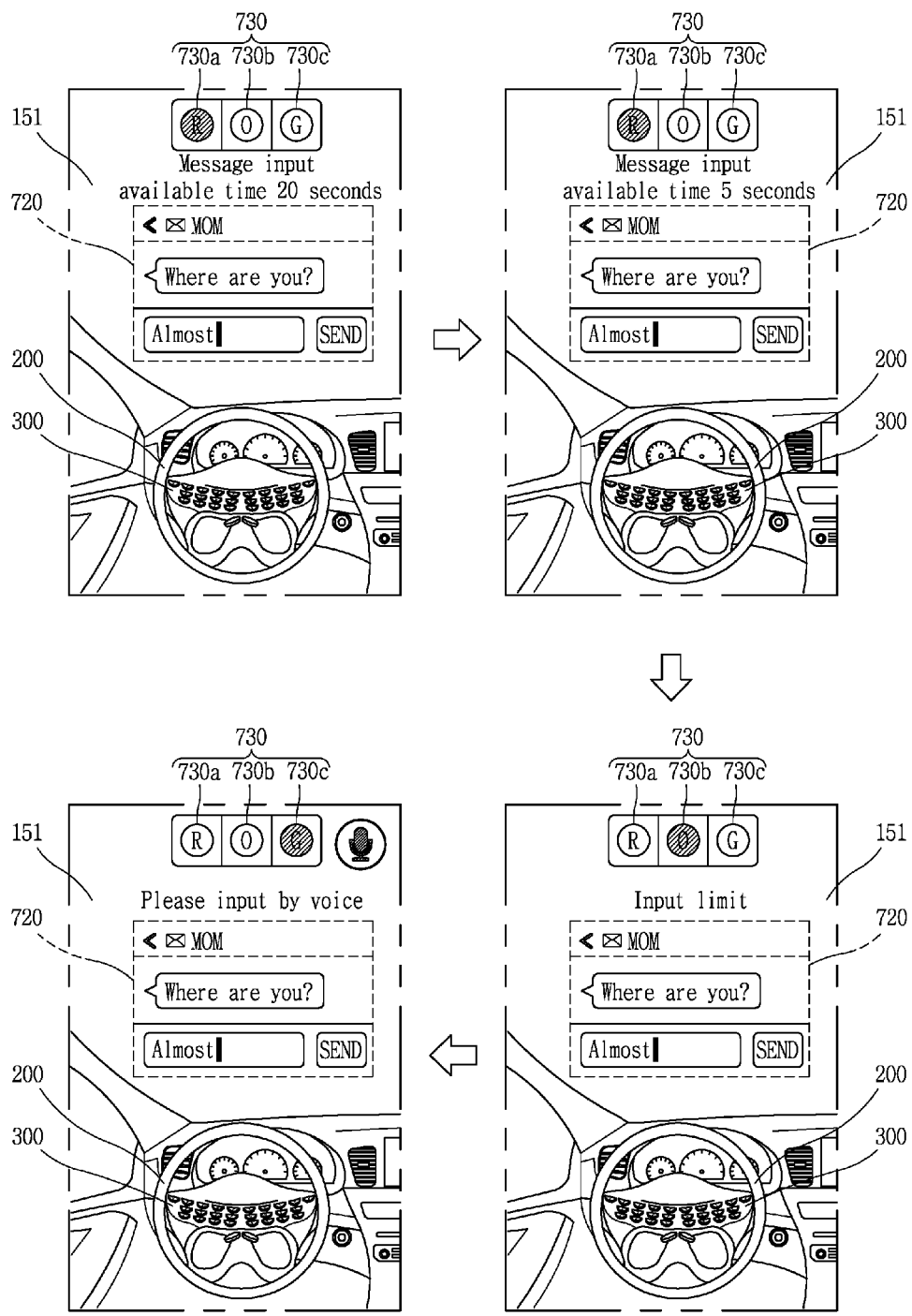
Figure 6C:
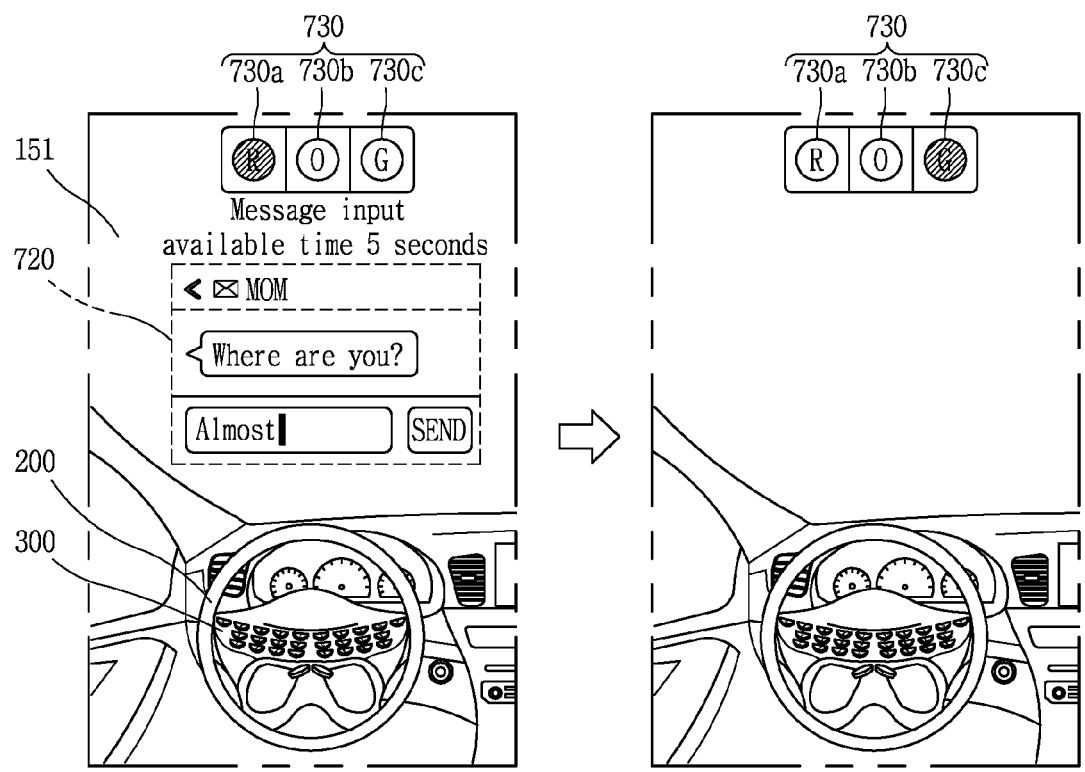

For example, as illustrated in the first drawing of FIG. 6A, the controller 180 can output notification information of "message input limited" 700 indicating that the keypad 300 is in a deactivated state on the display unit 151. The notification information indicating that the keypad 300 is in a deactivated state can be output on the display unit 151 when a user input is applied to the keypad in a deactivated state.

Also, as illustrated in the second drawing of FIG. 6A, when the keypad 300 is activated, and when a user input is applied to the keypad 300, the controller 180 can display a character 720 corresponding to a key input through the keypad 300 on the display unit 151. In addition, the controller 180 can also display notification information of "message input possible" 720 indicating that the keypad 300 is in an activated state on the display unit 151.

Also, as shown in FIG. 6B, when the keypad 300 is activated, and when an activation time of the keypad 300 is limited, the controller 180 can display an activation time of the keypad 300 on the display unit 151. The controller 180 can activate the keypad 300 based on a traffic signal state. The traffic signal state 730 may include at least one of a stop signal 730a, a waiting signal 730b, and a driving signal 730c.

In the stop signal 730a state, the controller 180 can activate the keypad 300. For example, as illustrated in the first drawing of FIG. 6B, the controller 180 can activate the keypad 300 based on "stop signal" 730a. In addition, the controller 180 can set a traffic signal waiting time as an input time of the keypad 300. Also, the controller 180 can display information 720 input through the keypad 300 on the display unit 151, along with activation of the keypad 300.

Further, the controller 180 can display input time information of the keypad 300 together with the input information 720 on the display unit 151. That is, information indicating a flow of input time of the keypad 300 may be displayed on the display unit 151. For example, as illustrated in the first and second drawings of FIG. 6B, information indicating "message input available time 20 seconds" and "message input available time 5 seconds" according to a flow of input time may be displayed on the display unit 151.

Also, when the stop signal 730a is switched to the waiting signal 730b, the controller 180 can deactivate the keypad 300 to limit input through the keypad 300. In this instance, the controller 180 can display notification information indicating that the keypad is deactivated on the display unit 151.

For example, as illustrated in the third drawing of FIG. 6B, the controller 180 can display notification information of "input limited" on the display unit 151.

Thereafter, as illustrated in the fourth drawing of FIG. 6B, when the waiting signal 730*b* is switched to the driving signal 730*c*, the controller 180 can activate the voice recognition function such that information may be input by voice, instead of the keypad 300. Accordingly, when inputting of information is impossible due to a limitation of input of the keypad 300, the user can continue to input the information by voice. For example, the user can continue to input the contents of the message which has been input through the keypad, by voice.

When the voice recognition function is activated, the controller 180 can determine whether a voice is received. In addition, when a voice is received, the controller 180 can convert the received voice into visual information and display the converted visual information on the display unit 151. Meanwhile, when the voice recognition function is activated, if a voice is not received for a preset period of time, the controller 180 can terminate the voice recognition function.

When the keypad is activated, and when the keypad is switched to a deactivated state, the controller 180 can limit outputting of contents of an event being displayed on the display unit 151. That is, a state of the keypad 300 and display information of the display unit 151 can be controlled together. For example, as illustrated in the first and second drawings of FIG. 6C, when the keypad 300 is deactivated while contents of the event is being output, the controller 180 can make the contents of the event disappear from the display unit 151. That is, all information can stop being displayed and disappear from the display unit 151 along with deactivation of the keypad 300 so that the driver concentrates on driving of the vehicle.

Further, after the contents of the event disappears from the display unit 151, and when the keypad 300 is activated again, the controller 180 can display the contents which have disappeared, on the display unit 151 again. Thus, even when the contents of the event disappear, the controller 180 can receive the contents of the event again later.

Also, even without a separate control command, the function related to the event can be executed again to a state before the deactivation of the keypad 300. That is, the controller 180 can execute the function related to the event to a state before the activation of the keypad 300, whereby information which had been input before the deactivation of the keypad 300 may be continue to be input.

For example, when the keypad 300 is deactivated while a message "Almost" is being input, the controller 180 can execute a message input function so that the message after "Almost" can be input when the keypad 300 is activated again. Thus, the user can input the message of a complete sentence of "Almost there." That is, even though the activation and deactivation of keypad 300 are switched while the vehicle is driving, the controller 180 can provide the function related to the event to the user with continuity.

Figure 7A:
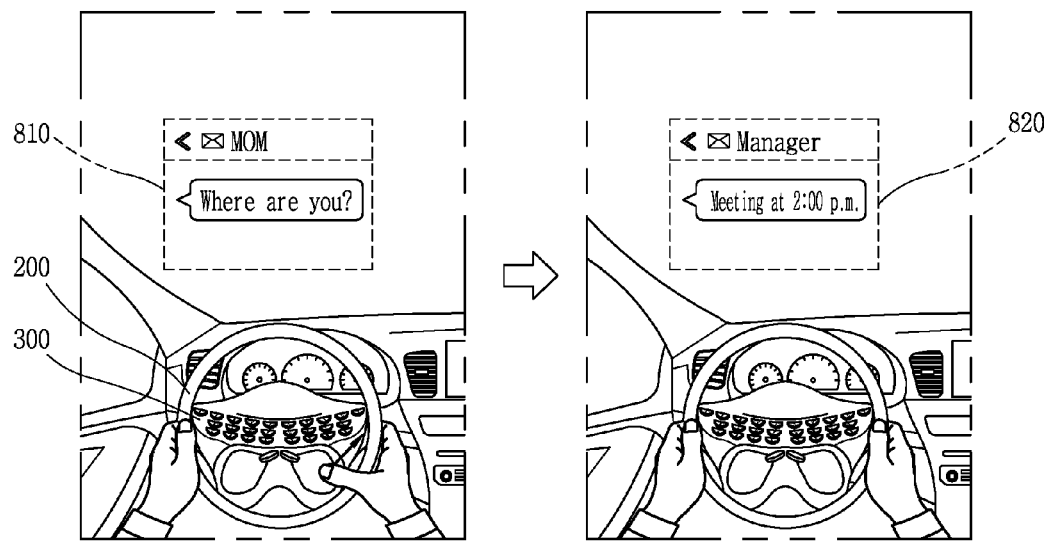
FIGS. 7A and 7B are conceptual views illustrating a method for executing a function related to an event which has occurred in a mobile terminal interworking with a vehicle, in the vehicle.
Figure 7B:
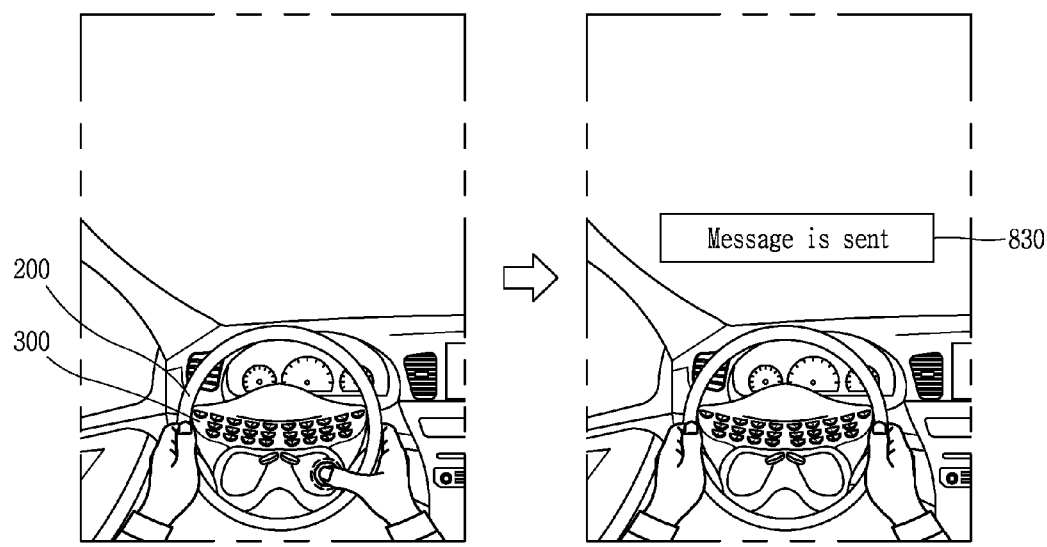

So far, the method for providing contents of an event that occurs in the mobile terminal interworking with the vehicle, and controlling the same has been described. Hereinafter, a method for executing a function related to an event that occurs in a mobile terminal interworking with a vehicle will be described. In particular FIGS. 7A and 7B are conceptual views illustrating a method for executing a function related to an event which has occurred in a mobile terminal interworking with a vehicle, in the vehicle.

When an event occurs in an external device interworking with the vehicle, a function related to the event can be controlled through the keypad 300 of the vehicle. Also, when an event occurs in an external device interworking with the vehicle, the vehicle can display an execution screen of the function related to the event on the display unit 151.

For example, when at least one message is received on the mobile terminal, the controller 180 of the vehicle can control a function related to the at least one received message on the display unit 151. In addition, the controller 180 can control the at least one message displayed on the display unit 151 by using the keypad 300 based on information related to driving of the vehicle.

When the keypad 300 is activated based on information related to driving of the vehicle, the controller 180 can control a function of an external device displayed on the display unit 151. For example, as illustrated in FIG. 7A, the vehicle is halted and one message 810 is displayed on the display unit 151. In this state, when a request for outputting another message 820 is received through the keypad 300, the controller 180 can display the other message 820 on the display unit 151. In addition, the output request through the keypad 300 includes various inputs such as a flicking input or a button input with respect to the keypad 300.

Also, based on information related to driving of the vehicle, the controller 180 can deactivate the keypad 300 so that information displayed on the display unit 151 may not be controlled by the keypad 300. For example, the vehicle is driving and one message 810, among at least one message, is displayed on the display unit 151. In this state, the controller 180 can deactivate the keypad 300 so that a request for outputting another message 820 is not received.

Also, when an event occurs in an external device interworking with the vehicle while the vehicle is driving, the controller 180 can automatically execute a function related to the event though the keypad 300. In this instance, the controller 180 can activate the keypad 300 based on the occurrence of the event in the external device interworking with the vehicle.

For example, as illustrated in FIG. 7B, when a message is received by the mobile terminal interworking with the vehicle, while the vehicle is driving, the controller 180 can transmit a message including current position information of the vehicle to an external terminal which has transmitted the message, based on an input applied to a specific key on the keypad 300. In this instance, notification information 830 indicating that the message has been transmitted can be displayed on the display unit 151. That is, when an event occurs in an external device interworking with the vehicle, the keypad can be activated, and a function related to the event can be provided through the keypad.

So far, the method for controlling a function related to an event which occurs in an interworking external device has been described. Hereinafter, a method for processing information received from each external device by associating them when at least two external devices interwork with a vehicle will be described. In particular FIGS. 8A and 8B are conceptual views illustrating a method for processing information received from external devices by associating the information, when at least two or more external devices interwork with a vehicle.

The vehicle according to an embodiment of the present disclosure can interwork with a navigation device and a mobile terminal together. In this instance, the controller 180 of the vehicle can receive information from each of the navigation device and the mobile terminal. For example, the controller 180 can receive estimated arrival time information from the navigation device and receive schedule information from the mobile terminal.

In addition, the controller 180 can execute a preset function based on the information received from each of the interworking devices. For example, the controller 180 can execute a message transmission function based on the estimated arrival time information and appointed time information included in the schedule information.

In more detail, as illustrated in the first drawing of FIG. 8A, when a estimated arrival time is 2:30 p.m. and an appointed time is 2:00 p.m., the controller 180 can execute a function of sending a message indicating that the appointed time is delayed to an external terminal related the appointment. In addition, when the message transmission function is executed based on information received from each of the interworking devices, the controller 180 can activate the keypad 300. In this instance, the controller 180 can activate the keypad 300 by limiting at least one of an input time and an input character amount of the keypad based on information related to driving of the vehicle.

Also, when a preset type of input is applied to the keypad 300, the controller 180 can include current position information and prearranged arrival information received from the navigation device in the contents of the message, and automatically send the message to the external terminal related to the schedule information. For example, as illustrated in FIG. 8A, the controller 180 can include the estimated arrival time and the current position information in the contents of the message and send the message to a "junior" terminal.

Further, the controller 180 can control functions installed in an interworking external device through keypad 300. In more detail, the vehicle according to an embodiment of the present disclosure may further include a camera for capturing an image. In addition, the controller 180 can transmit an image captured through the camera to the mobile terminal such that the image may be used for a function installed in the mobile terminal.

The controller 180 can also input information by using the keypad 300 and transmit the input information together with the captured image to the mobile terminal. Further, the controller 180 can also transmit current position information to the mobile terminal.

In this instance, the mobile terminal can use the captured image, the input information, and the current position information through a previously installed function. The previously installed function may be selected by the user of the vehicle or may be set in advance. When the previously installed function is selected by the user, the controller 180 can control the camera of the vehicle through input of the keypad 300.

For example, as illustrated in FIG. 8B, using an application of a previously installed SNS function, the mobile terminal can transmit the input information and the current position information to the SNS server. Thus, the SNS function installed in the mobile terminal can be conveniently used by using the vehicle.

Figure 9:
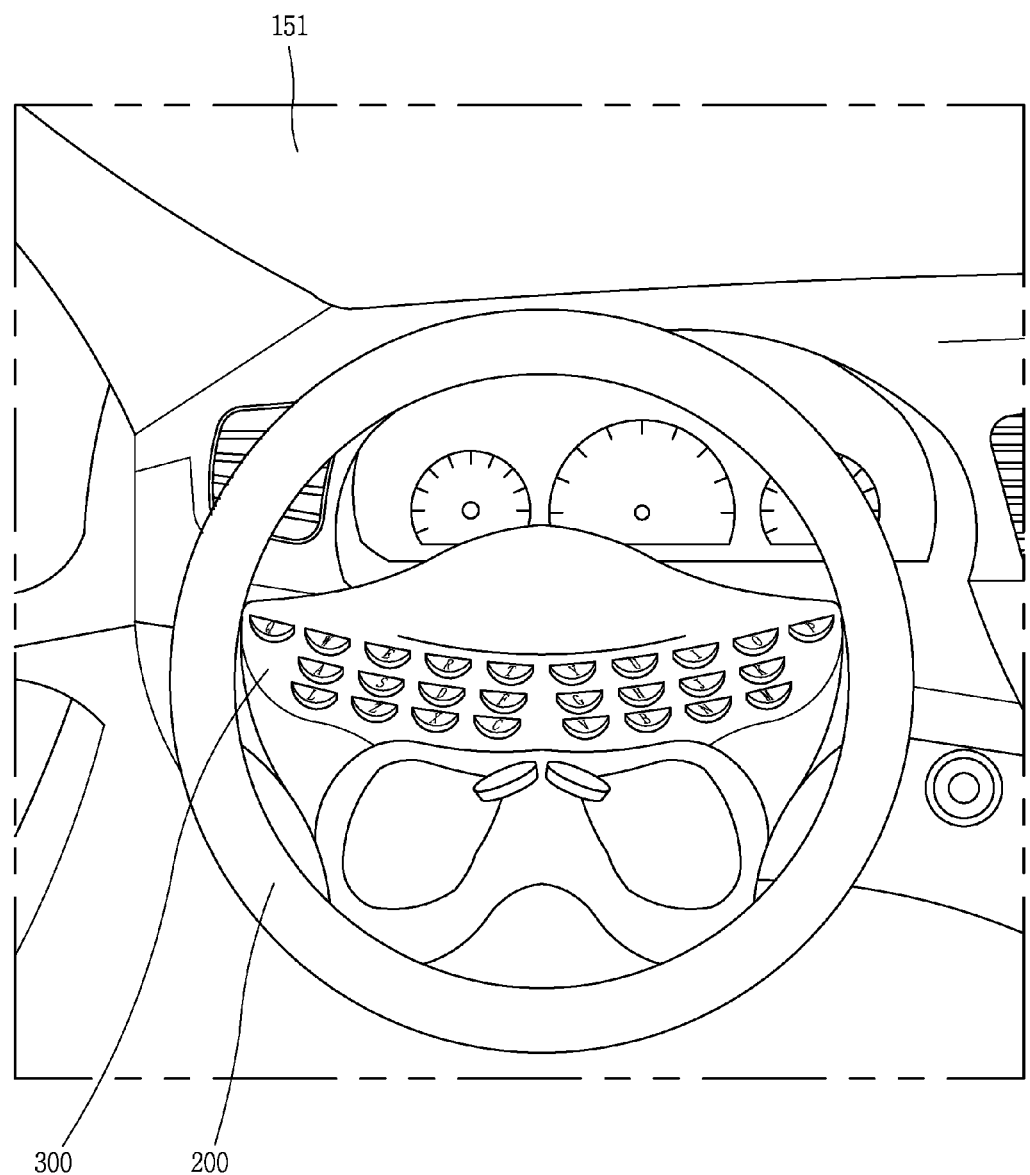
FIG. 9 is a conceptual view illustrating a keypad disposed in a circular steering unit of a vehicle.
Figure 10:
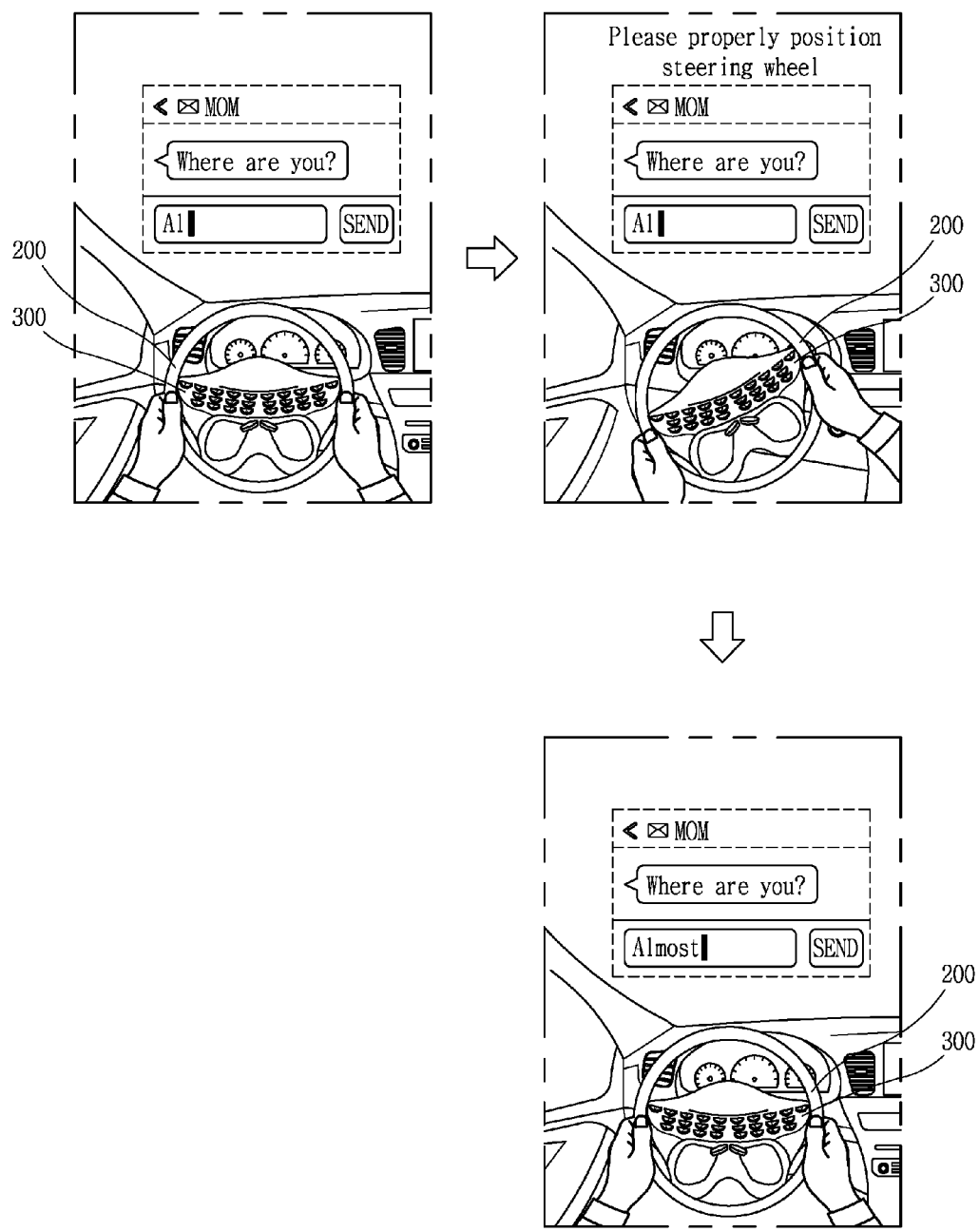
FIG. 10 is a conceptual view illustrating a method for providing notification information according to a position of a circular steering unit of a vehicle.

Hereinafter, a method for controlling a keypad 300 disposed in a circular steering unit 200 of the vehicle will be described. In particular, FIG. 9 is a conceptual view illustrating a keypad 300 disposed in a circular steering unit 200 of a vehicle, and FIG. 10 is a conceptual view illustrating a method for providing notification information according to a position of the circular steering unit 200 of a vehicle. As described above, the vehicle according to an embodiment of the present disclosure may include at least one keypad among a hard keypad 300 and a soft keypad 300. The hard keypad 300 includes a button corresponding to at least one key.

In an embodiment, the keypad 300 can be mounted on the circular steering unit 200. The circular steering unit 200 is a user input unit for moving a direction of a wheel of the vehicle. In more detail, the user can rotate a wheel of the vehicle by rotating the circular steering unit 200, thereby controlling a driving direction of the vehicle. The circular steering unit 200 is called various names such as a steering wheel or a handle.

For example, as illustrated in FIG. 9, the keypad 300 according to an embodiment of the present disclosure can be mounted on the circular steering unit 200. Accordingly, the user can conveniently apply input through the keypad 300 even without a separate operation while driving the vehicle.

Also, in the keypad 300 mounted on the circular steering unit 200, a plurality of buttons forming the keypad 300 are disposed to be oriented to both sides of the circular steering unit 200 in order to increase user convenience. For example, as illustrated in FIG. 9, at least some of the keys forming the keypad 300 are disposed to be oriented to the left side of the circular steering unit 200, and the other remaining keys may be disposed to be oriented to the right side of the circular steering unit 200. Accordingly, since the keys are disposed in the vicinity of a region in which the user's hands are positioned on the circular steering unit 200, whereby the user can conveniently perform key input.

Also, a space bar can be disposed within a fingering region that the user's thumb reaches on the keypad 300 mounted on the circular steering unit 200. Meanwhile, in order to secure driving safety of the vehicle, the controller 180 can limit input of the keypad 300 according to a posture of the circular steering unit 200. In more detail, in order to secure driving safety of the vehicle, when the posture of the circular steering unit 200 is a posture in which the wheels of the vehicle face a front side, the controller 180 can activate the keypad 300 so that inputting may be performed through the keypad 300.

Also, when the posture of the circular steering unit 200 is a posture in which the wheels of the vehicle do not face the front side, the controller 180 can deactivate the keypad 300 so that inputting through the keypad 300 is limited. For example, when the posture of the circular steering unit 200 is a posture in which the wheels of the vehicle face a right or left side, the controller 180 can limit input through the keypad 300.

That is, when the vehicle moves in a straight line, rather than moving in a curve, it is determined that safety of driving is high, and in this instance, the keypad 300 can be activated. Also, the controller 180 can determine whether the user currently operates the vehicle based on the posture of the circular steering unit 200, and when the posture of the circular steering unit 200 is changed, the controller 180 determines that the vehicle is operated and input of the keypad can be limited. For example, when the controller 180 detects that the circular steering unit 200 is rotated in a clockwise direction or in a counterclockwise direction, the controller 180 can deactivate the keypad 300.

Further, when input through the keypad 300 is limited, the controller 180 can provide notification information indicating that the posture of the circular steering unit 200 should be changed to the user. For example, as illustrated in FIG. 10, when a posture of the circular steering unit 200 is changed, the controller 180 can display notification information related to a change in the posture of the circular steering unit 200 on the display unit 151. Accordingly, the user can change the posture of the circular steering unit 200 and perform inputting through the keypad 300.

In addition, when the keypad 300 is in an activated state, the controller 180 can limit movement of the circular steering unit 200. That is, while an input is applied too the keypad 300 disposed on the circular steering unit 200, the controller 180 can limit movement of the circular steering unit 200 such that the vehicle may not be moved by the circular steering unit 200. The state in which movement of the circular steering unit 200 is limited may be termed a lock state.

Also, when the keypad 300 is in a deactivated state, the controller 180 can enable the circular steering unit 200 to be moved. In this instance, the circular steering unit 200 may be in a state of controlling a driving direction of the vehicle, as an intrinsic function. This state may be termed a driving state in which the circular steering unit 200 may be moved. In addition, the controller 180 can deactivate the keypad 300 such that inputting through the keypad 300 is limited.

Thus, the keypad 300 can be provided on the steering wheel of the vehicle so that the user can conveniently use the keypad 300 while driving a vehicle. Therefore, the driver can easily perform key input, even while he or she drives the vehicle. Also, since key input through the keypad 300 is limited according to an operational state of the vehicle, a rate of traffic accident can be reduced. In addition, since key input through the keypad 300 is allowed according to an operational state of the vehicle, the driver may send a message even while he is driving.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A vehicle comprising:
   a wireless communication processor configured to provide wireless communication;
   a keypad;
   a display unit configured to display a character corresponding to a key input through the keypad;
   a controller configured to:
   activate the keypad when information related to a driving of the vehicle satisfies a preset condition, and
   deactivate the keypad when the information related to the driving of the vehicle does not satisfy the preset condition; and
   a voice recognition unit configured to input and output an external voice,
   wherein the controller is further configured to activate a voice input function through the voice recognition unit when the keypad is deactivated.

2. The vehicle of claim 1, wherein the keypad is mounted on a steering wheel of the vehicle, and
   wherein the controller is further configured to receive an event notification from an external device via the wireless communication processor.

3. The vehicle of claim 2, wherein the controller is further configured to:
   display on the display unit a notification concerning the received event notification, when the information related to the driving of the vehicle satisfies the preset condition, and
   output, via an audio output unit in the vehicle, the notification concerning the received event notification, when the information related to the driving of the vehicle does not satisfy the preset condition.

4. The vehicle of claim 2, wherein the controller is further configured to:
   not output a notification concerning the received event notification, when the information related to the driving of the vehicle indicates the vehicle is being driven, and
   output the notification concerning the received event notification, when the information related to the driving of the vehicle indicates the vehicle is not being driven.

5. The vehicle of claim 2, wherein the controller is further configured to:
   display on the display unit a notification concerning the received event notification, when the external device matches an approved mobile terminal, and
   not display the notification on the display unit, when the external device does not match the approved mobile terminal.

6. The vehicle of claim 2, wherein the controller is further configured to output the notification concerning the received event notification via a speaker included in the vehicle, when the information related to the driving of the vehicle indicates there are no passengers in the vehicle.

7. The vehicle of claim 2, wherein the controller is further configured to display notification information on the display unit indicating if the keypad is deactivated or activated.

8. The vehicle of claim 2, wherein the controller is further configured to:
   deactivate the keypad a predetermined amount of time after activating the keypad based on the information related to the driving of the vehicle, and
   display a countdown of time left in the predetermined amount of time on the display unit.

9. The vehicle of claim 8, wherein the information related to the driving of the vehicle corresponds to a traffic signal, and
wherein the controller is further configured to activate the keypad when the traffic signal indicates the vehicle should stop, and deactivate the keypad when the traffic signal indicates the vehicle should go.

10. The vehicle of claim 9, wherein the controller is further configured to:
display contents of the received event during the predetermined amount of time the keypad is activated, and
stop displaying the contents on the display unit when the predetermined amount of time expires and the keypad is deactivated.

11. The vehicle of claim 2, wherein the controller is further configured to determine information input via the keypad is destination information in response to the information being input via the keypad less than a predetermined time after the vehicle is started.

12. The vehicle of claim 2, wherein the controller is further configured to limit at least one of a number of characters that can be input through the keypad and an input time based on the information related to the driving of the vehicle.

13. The vehicle of claim 12, wherein the controller is further configured to display information regarding the limited number of characters that can be input through the keypad and the limited input time on the display unit.

14. The vehicle of claim 2, wherein the controller is further configured to lock the steering wheel when the keypad is activated.

15. The vehicle of claim 2, wherein the controller is further configured to:
receive schedule information from the external device, and
activate the keypad such that inputting can be performed through the keypad so that a preset function is performed based on the schedule information and the information related to the driving of the vehicle.

16. The vehicle of claim 2, further comprising:
a camera,
wherein when a preset input is applied to the keypad, the controller is further configured to capture an image through the camera, and transmit the captured image to an SNS server through the external device.

17. The vehicle of claim 1, wherein the information related to the driving of the vehicle includes at least one of driving state information of the vehicle, road information, and traffic signal information, and the driving state information of the vehicle includes at least one of a speed, acceleration, halt, and parking of the vehicle.

18. A vehicle comprising:
a wireless communication processor configured to provide wireless communication;
a display unit configured to display a character corresponding to a key input through a keypad; and
a controller configured to:
receive an event notification from an external device via the wireless communication processor,
output a notification concerning the received event notification, when the information related to the driving of the vehicle indicates the vehicle is being driven,
output a prompt questioning whether or not detailed contents should be output, when the information related to the driving of the vehicle indicates the vehicle is not being driven, and
output the detailed contents concerning the received event, in response to a confirmation to the output prompt.

19. A vehicle comprising:
a wireless communication processor configured to provide wireless communication;
a display unit configured to display a character corresponding to a key input through a keypad; and
a controller configured to:
receive an event notification from an external device via the wireless communication processor,
display a notification with a warning color concerning the received event notification, when the information related to the driving of the vehicle indicates the vehicle is being driven, and
display the notification with a green color concerning the received event notification, when the information related to the driving of the vehicle indicates the vehicle is not being driven.

20. A vehicle comprising:
a wireless communication processor configured to provide wireless communication;
a display unit configured to display a character corresponding to a key input through a keypad; and
a controller configured to:
receive an event notification from an external device via the wireless communication processor,
display a notification concerning the received event notification, when the information related to the driving of the vehicle indicates the vehicle is being driven at a preset location, and
not display the notification concerning the received event notification, when the information related to the driving of the vehicle indicates the vehicle is not being driven at the preset location.

21. A method of controlling a vehicle interworking with an external device, the method comprising:
wirelessly communicating, via a wireless communication processor of the vehicle, with the external device;
displaying, via a display unit of the vehicle, a character corresponding to a key input through the keypad;
receiving, via a controller, an event notification from an external device via the wireless communication processor;
displaying a notification concerning the received event notification on the display, when the information related to the driving of the vehicle indicates the vehicle is being driven at a preset location; and
not displaying the notification concerning the received event notification on the display, when the information related to the driving of the vehicle indicates the vehicle is not being driven at the preset location.

* * * * *